United States Patent
Klingler et al.

(10) Patent No.: US 11,070,676 B2
(45) Date of Patent: Jul. 20, 2021

(54) EMBEDDED AUDIO PASSCODE IN RINGTONE TO ESTABLISH SECURE CONNECTION FOR ARBITRARY PHONE RELAY

(71) Applicant: Apple Inc., Cupertino, CA (US)

(72) Inventors: Daniel C. Klingler, Mountain View, CA (US); David L. Biderman, Los Gatos, CA (US); Nicholas M. Fraioli, Los Altos, CA (US); Christopher M. Garrido, San Jose, CA (US); Adam E. Kriegel, Mountain View, CA (US); Shuang Liu, Menlo Park, CA (US); Richard M. Powell, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/829,636

(22) Filed: Mar. 25, 2020

(65) Prior Publication Data

US 2020/0314247 A1     Oct. 1, 2020

Related U.S. Application Data

(60) Provisional application No. 62/824,854, filed on Mar. 27, 2019.

(51) Int. Cl.
*H04M 3/54* (2006.01)
*H04W 84/18* (2009.01)
*H04L 12/28* (2006.01)

(52) U.S. Cl.
CPC .......... *H04M 3/54* (2013.01); *H04L 12/2823* (2013.01); *H04L 12/2834* (2013.01); *H04W 84/18* (2013.01); *H04L 2012/2849* (2013.01)

(58) Field of Classification Search
CPC . H04L 12/28; H04L 12/2823; H04L 12/2834; H04L 2012/2849; H04M 3/42; H04M 3/54; H04W 84/18
USPC .................................................... 379/211.02
See application file for complete search history.

(56) References Cited

U.S. PATENT DOCUMENTS

| | | | |
|---|---|---|---|
| 2016/0050321 A1* | 2/2016 | Tassone | H04L 41/00 370/261 |
| 2017/0006471 A1* | 1/2017 | Kim | H04W 12/06 |
| 2018/0204204 A1* | 7/2018 | Giraudo | G06Q 20/4012 |

* cited by examiner

*Primary Examiner* — Harry S Hong
(74) *Attorney, Agent, or Firm* — Kilpatrick Townsend and Stockton LLP

(57) ABSTRACT

Techniques to use an embedded passcode within an audio ringtone to establish a secure connection for arbitrary phone relay are described. The use of an embedded passcode enables encrypted ad-hoc connections for the relay of audio of an incoming telephone call to a secondary device, such as a virtual assistant enabled smart speaker device.

18 Claims, 14 Drawing Sheets

EMBEDDED AUDIO PASSCODE IN RINGTONE TO ESTABLISH SECURE CONNECTION FOR ARBITRARY PHONE RELAY

RELATED APPLICATION

The present application is a continuation of and claims the benefit of U.S. Provisional Patent Application No. 62/824,854, filed on Mar. 27, 2019, which is hereby incorporated herein by reference in its entirety.

BACKGROUND OF THE DISCLOSURE

Electronic devices known in the art can be configured to stream data between devices. For example, a smartphone device can stream audio data over a Wi-Fi or Bluetooth data connection to secondary device, such as a headset device, laptop device, desktop device, or smart speaker device. The ability to stream audio to the secondary device may require a previously established relationship between the smartphone device and the secondary device, such as Bluetooth pairing or a common network connection.

SUMMARY OF THE DESCRIPTION

Embodiments described herein provide techniques to use an embedded passcode within an audio ringtone to establish a secure connection for arbitrary phone relay. The use of an embedded passcode allows ad-hoc connections for relay of telephone call audio to a secondary device.

Embodiments described herein provide a multi-user smart home device comprising one or more speakers, a data interface, a memory device to store instructions, and one or more processors coupled with the memory device. The one or more processors execute instructions that cause the one or more processors to receive a first message via the data interface, the first message to indicate that a mobile electronic device proximate with the multi-user smart home device has an incoming call, the incoming call received via a baseband processor of the electronic device, determine a first audio sequence for playback via the one or more speakers, wherein the first audio sequence includes a call announcement for the incoming call, encode a seed identifier into the first audio sequence to generate a second audio sequence, the seed identifier to identify the multi-user smart home device to the mobile electronic device and to enable generation of an encryption key to encrypt a data channel between the multi-user smart home device and the mobile electronic device, play the second audio sequence via the one or more speakers, and receive a second message via the data interface, the second message to indicate that the mobile electronic device is to relay audio of the incoming call to the multi-user smart home device via an encrypted data channel, the encrypted data channel encrypted based on the encryption key. The multi-user smart home device can then play audio data for the incoming call via the one or more speakers, the audio data received via the encrypted data channel.

One embodiment provides for a non-transitory machine-readable medium storing instructions to cause one or more processors of a mobile electronic device to perform operations comprising receiving a notice of an incoming call from a baseband processor of the mobile electronic device, sending a message to a multi-user smart home device indicating that a call is incoming at the smart home device, receiving an audio signal via a microphone of the mobile electronic device, the audio signal including an embedded code, and establishing an encrypted data channel with the multi-user smart home device, the encrypted data channel to relay audio of the incoming call to the multi-user smart home device, wherein the encrypted data channel is encrypted via an encryption key generated using the embedded code.

One embodiment provides for a mobile electronic device comprising a microphone, a data interface, a baseband processor, a memory device to store instructions, and one or more processors coupled with the memory device, the one or more processors to execute the instructions. The instructions cause the one or more processors to receive an indication of an incoming call, the incoming call received via the baseband processor, transmit a first message via the data interface to a multi-user smart home device proximate with the mobile electronic device, the first message to indicate that the mobile electronic device has an incoming call, receive an audio sequence via the microphone, the audio sequence having an encoded seed identifier, validate authenticity of the multi-user smart home device via the seed identifier, generate an encryption key using the seed identifier, transmit a second message via the data interface, the second message to indicate that the mobile electronic device is to relay audio of the incoming call to the multi-user smart home device via an encrypted data channel, the encrypted data channel encrypted based on the encryption key, and transmit audio data for the incoming call to the multi-user smart home device via the encrypted data channel.

Other features of the present embodiments will be apparent from the accompanying drawings and from the detailed description, which follows.

BRIEF DESCRIPTION OF THE DRAWINGS

Embodiments of the present invention are illustrated by way of example, and not limitation, in the figures of the accompanying drawings in which reference numbers are indicative of origin figure, like references may indicate similar elements, and in which.

DETAILED DESCRIPTION

Figure 1A:
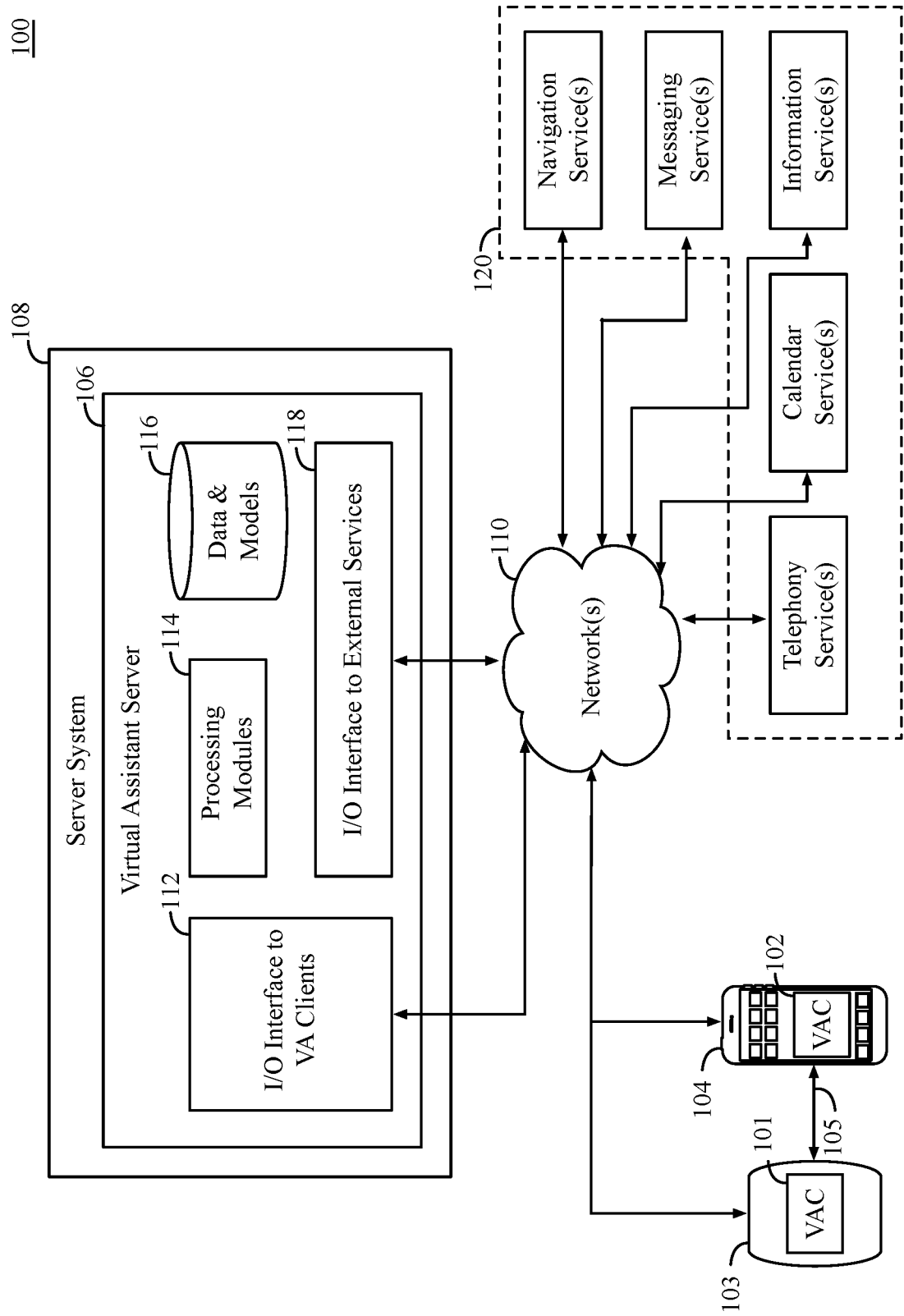
FIG. 1A-1B illustrates block diagrams of electronic device systems to enable virtual assistant services and secure networking at a smart home device, according to embodiments.

In one embodiment, a secure communications link between a smart home device and a smartphone device can be used to relay audio for a telephone call from the smartphone device to the smart home device. For example, if an incoming call is received on a smartphone device, the incoming call can be accepted via the smart home device. The speakers and microphone of the smart home device can then be used to perform the call, with the audio data for the call securely communicated between the smart home device and the smartphone device. In one embodiment, incoming call relay can be performed between devices that have been previously paired with the smart home device. In one embodiment, incoming call relay can be performed on an ad-hoc basis for an un-paired smartphone within a threshold distance from the smart home device. Ad-hoc call relay can be configured for devices with access to a common local network. In one embodiment, ad-hoc call relay can be configured using direct or peer-to-peer wireless data channels, such as Bluetooth or Wi-Fi direct.

In one embodiment, the availability of telephone relay can be configured in configuration settings for the smart home device or the smart home device. Incoming call relay can be allowed for all devices in range of a smartphone device or can be limited to a subset of devices. The devices can be specific devices, any device on a local network, or any device within direct wireless range of the telephone relay device. While a smartphone and a smart home device are described in the context of incoming call relay, in one embodiment incoming call relay can be configured between any cellular baseband capable device and any secondary electronic or computing device that includes a microphone, a speaker, and a network or data interface.

In the figures and description to follow, reference numbers are indicative of the figure in which the referenced element is introduced, such that an element having a reference number of N00 is first introduced in FIG. N. For example, an element having a reference number between 100 and 199 is first shown in FIG. 1A, while an element having a reference number between 200 and 299 is first shown in FIG. 2, etc. Within a description of a given figure, previously introduced elements may or may not be referenced.

The processes and operations depicted in the figures that follow can be performed via processing logic that includes hardware (e.g. circuitry, dedicated logic, etc.), software (as instructions on a non-transitory machine-readable storage medium), or a combination of both hardware and software. Although some of the processes are described below in terms of sequential operations, it should be appreciated that some of the operations described may be performed in a different order. Moreover, some operations may be performed in parallel rather than sequentially. Additionally, some operations may be indicated as optional and are not performed by all embodiments.

Various devices that lack cellular voice capability can be used as secondary or peripheral devices that can be configured to accept a relay of an incoming call from a cellular voice capable device. A cellular voice capable device refers to a device having the capability to at least receive incoming telephone calls via any cellular voice technology (GSM, CDMA, etc.) and also includes technologies that relay voice telephone calls over cellular data connections, such as voice over long-term evolution data channels (VoLTE).

In one embodiment, an incoming telephone call can be relayed to a smart home device. A system and network environment that provides a virtual assistant enables smart home device is described in FIG. 1A-1B and FIG. 2 below.

Virtual Assistant Enabled Smart Home Device Network System and Environment

Figure 1B:
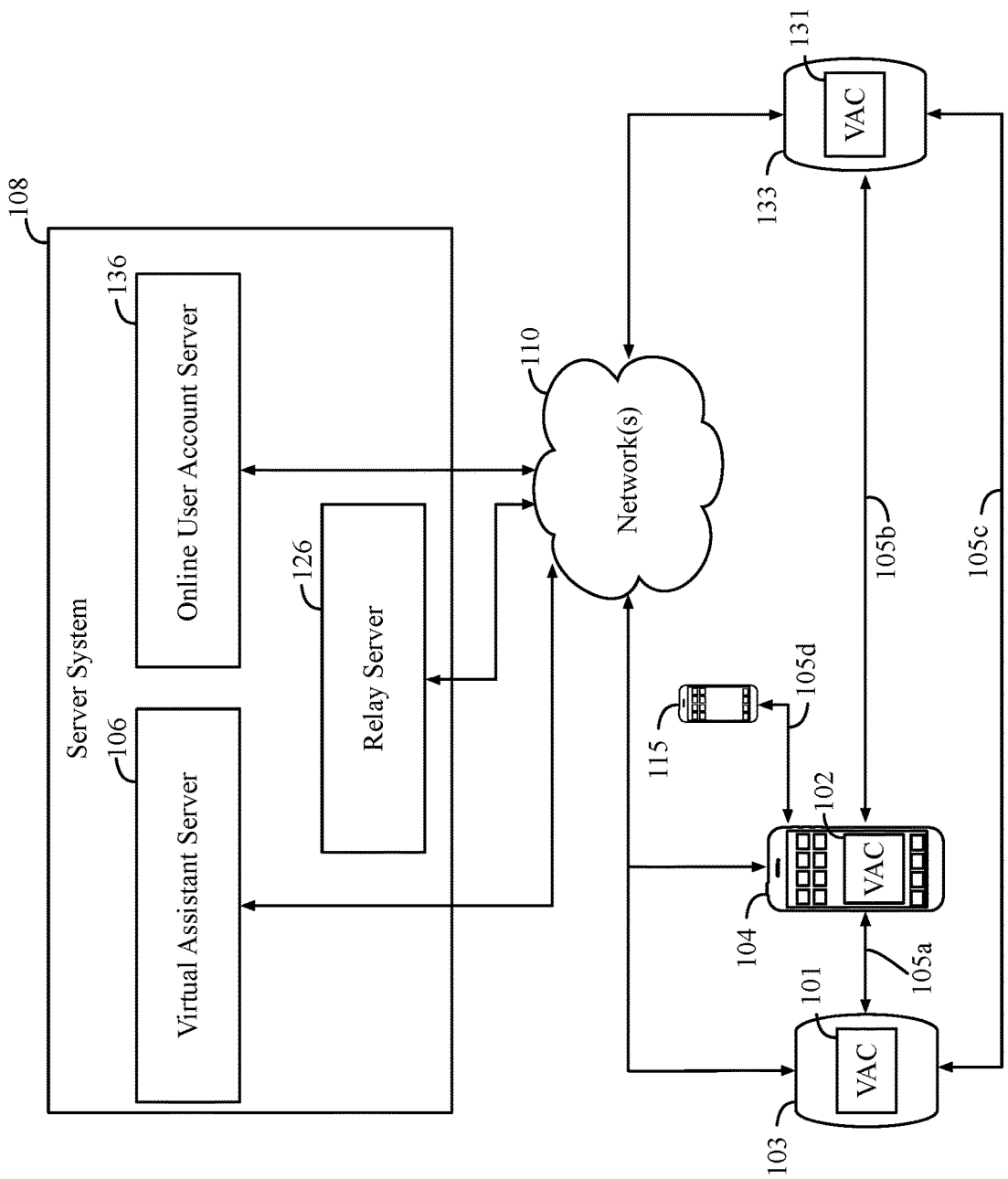

FIG. 1A-1B illustrates block diagrams of electronic device systems to enable virtual assistant services and secure networking at a smart home device. FIG. 1A illustrates a block diagram of a virtual assistant system 100, according to embodiments described herein. FIG. 1B illustrates a block diagram of a companion link system 130 to enable communication between devices within a virtual assistant system 100, according to embodiments. The companion link system 130 of FIG. 1B can be used to establish a secure data connection between electronic devices that provides enhanced security over the encryption provided by the underlying transport (e.g., Wi-Fi, Bluetooth, etc.). This secure data connection can be used to relay audio for incoming calls, for example, for a smartphone device and a smart home device. This secure data connection can be used in place of, or in addition to the embedded audio code described below for ad-hoc incoming call relay. The block diagrams of FIG. 1A-1B are in part logical, in that some components illustrated may separate logical components that reside within the same physical server or device.

FIG. 1A illustrates a virtual assistant system 100 that provides a processing system that interprets natural language input that is received in spoken and/or textual form to infer user intent. The virtual assistant system 100 can then perform actions based on the inferred user intent. In various embodiments, the system can perform a set of operations including, but not limited to identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form. As used herein, term virtual assistant can be used interchangeably with the terms "digital assistant," "intelligent automated assistant," or "automatic digital assistant," and generally refers to any information processing system that interprets natural language input in spoken and/or textual form to perform actions on behalf of a user.

A virtual assistant can accept a user request at least partially in the form of a natural language command, request, statement, narrative, and/or inquiry. Typically, the user request can seek either an informational answer or performance of a task by the virtual assistant. A satisfactory response to the user request can be a provision of the requested informational answer, a performance of the requested task, or a combination of the two. For example, a user can ask the virtual assistant a question, such as "Where am I right now?" Based on the user's current location, the virtual assistant can answer, "You are in Golden Gate Park near the west entrance." The user can also request the performance of a task, for example, "Please invite my friends to my girlfriend's birthday party next week." In response, the virtual assistant can acknowledge the request by saying "Yes, right away," and then send a suitable calendar invite on behalf of the user to each of the user's friends listed in the user's electronic address book. During performance of a requested task, the virtual assistant can sometimes interact with the user in a continuous dialogue involving multiple exchanges of information over an extended period of time. There are numerous other ways of interacting with a virtual assistant to request information or performance of various tasks. In addition to providing verbal responses and taking programmed actions, the virtual assistant can also provide responses in other visual or audio forms, e.g., as text, alerts, music, videos, animations, etc.

As shown in FIG. 1A, the virtual assistant system 100 can include a server system 108 having one or more server devices. In one embodiment, the server system 108 includes a virtual assistant server 106 that can communicate with multiple virtual assistant clients (VAC) (e.g., VAC 101. VAC 102). The virtual assistant clients can execute on multiple electronic devices that can connect and communicate with the server system 108. A first virtual assistant client (e.g., VAC 101) can execute on a smart home device 103, such as a smart speaker device. A second virtual assistant client (e.g., VAC 102) can execute on a user device 104, such as a smartphone device. The virtual assistant clients can communicate with the virtual assistant server 106 through one or more networks 110, which can include a combination of local and wide area networks. The various virtual assistant clients can provide client-side functionality, such as user-facing input and output processing, and can communicate with the virtual assistant server 106. The virtual assistant server 106 can provide server-side functionalities a multitude of virtual assistant clients residing on any number of user devices connected via the one or more networks 110.

In one embodiment, the virtual assistant server 106 includes an I/O interface to VA clients 112, one or more processing modules 114, storage devices including data and processing models 116, and an I/O interface to external services 118. The I/O interface to VA clients 112 can facilitate the client-facing input and output processing for the virtual assistant server 106. The one or more processing modules 114 can utilize the data and processing models 116 to perform natural language processing on speech input to infer a user's intent. The one or more processing modules 114 can then perform task execution based on the inferred user intent. The I/O interface to external services 118 can facilitate communication between the virtual assistant server 106 and external services 120 through one or more networks 110. In one embodiment, the virtual assistant server 106 can communicate with the external services 120 to complete tasks in response to requests received the VAC 102 on the user device 104, or to acquire information in response to a query received at the VAC 102. External services 120 can include, but are not limited to, navigation service(s), messaging service(s), information service(s), calendar service(s), and/or telephony services(s), and the like. For example, one or more navigation services can be used to enable turn-by-turn navigation on the user device 104 in response to a request received at the VAC 102 on the user device. External services can additionally include location information, weather, financial information, or account information. In various embodiments, logic to enable some of the external services 120 can reside within the server system 108, while some parts of the logic can reside within the user device 104.

The virtual assistant server 106 can communicate with one or more messaging services to send messages in response to speech input received from a virtual assistant client. Information service(s) such as Internet search engines or information databases can be accessed by the virtual assistant server 106 to provide information to a user in response to an information query. In one embodiment, the virtual assistant server 106 can access one or more calendar services to schedule a task or event, or to satisfy queries with respect to a task or event. The virtual assistant server 106 can also access one or more telephony services to initiate telephone calls for a user.

In various embodiments, the virtual assistant server 106 can assist the VAC 101, 102 by processing of speech input provided to the client by a user. In one embodiment, text to speech processing and natural language processing can be performed in part by the VAC 101, 102 and in part on the virtual assistant server 106. The data and processing models 116 of the virtual assistant server 106 may be more complex and higher performance than corresponding models that are locally accessible to VAC 101, 102. Accordingly, the virtual assistant server 106 may be more suitable for processing some commands and can send the results of the processed commands back to the VAC 101, 102 over the one or more networks 110. The operations to construct the virtual assistant interaction flow presented to a user can be shared between the virtual assistant server 106 and the VAC 101, 102. In one embodiment, initial processing of user input, presentation of speech output, and access to most user data can be performed by the VAC 101, 102. In such embodiment, speech recognition and natural language processing can be performed at least in part by the virtual assistant server 106.

The smart home device 103 and the user device 104 can communicate with each other and the server system 108 via one or more networks 110 local area networks (LAN) and/or wide area networks (WAN), e.g., the Internet. The one or more networks can be implemented using any known interconnect or network protocol, including various wired or wireless protocols. Exemplary interconnect and/or network protocols include Ethernet, Universal Serial Bus (USB), FIREWIRE, Global System for Mobile Communications (GSM), Enhanced Data GSM Environment (EDGE), code division multiple access (CDMA), time division multiple access (TDMA), Long Term Evolution (LTE), Bluetooth, Wi-Fi, voice over Internet Protocol (VoIP), Wi-MAX, or any other suitable communication protocol.

In various embodiments, the server system 108 can be implemented on a standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

The smart home device 103, in various embodiments, can be a smart speaker device, smart home hub device, smart home appliance, or another type of intelligent electronic appliance or device. For example, and in one embodiment the smart home device 103 is a smart speaker device that can be configured to be part of a distributed media playback system. A specific example of a smart speaker device is the HomePod® smart speaker device from Apple Inc. of Cupertino, Calif. In one embodiment, the smart home device 103 can be a smart home hub device that is configured to manage one or more other devices in a digitally connected smart home system including, but not limited to intelligent and/or digitally connected devices such as a smart thermostat or smart lighting system. The smart home device 103 can connect with the user device 104 to exchange data. The connection between the smart home device 103 and the user device 104 can be performed over the one or more networks 110. In one embodiment, the smart home device 103 and the user device 104 can dynamically maintain a persistent connection as the user device 104 transitions between LAN and Internet connections.

The user device 104 can be any suitable electronic device. For example, and in one embodiment the user device 104 can be a portable multifunctional device, a multifunctional device, or a personal electronic device. A portable multifunctional device can be, for example, a mobile telephone that also contains other functions, such as a personal data assistant, a music player, and/or an application processor capable of executing applications (e.g., apps, etc.). Specific examples of portable multifunction devices can include the iPhone®, iPod Touch®, and iPad® devices from Apple Inc. of Cupertino, Calif. Other examples of portable multifunction devices can include, without limitation, laptop or tablet computers, or a wearable electronic device such as a smart watch device. In some embodiments, the user device 104 can be a non-portable multifunctional device such as, but not limited to a desktop computer, game console, television, or television set-top box. In one embodiment, the user device 104 can be a fixture in a home, vehicle, motor home, etc. In some embodiments, the user device 104 can be or work in conjunction with a door or another point of entry for a vehicle, home, or mobile home.

The user device 104 can include a touch-sensitive surface (e.g., touchscreen displays and/or touchpad interfaces), or one or more physical user-interface devices such as a physical keyboard, mouse, and/or joystick.

In one embodiment, the VAC 101 on the smart home device 103 can communicate with the VAC 102 on the user device 104 to facilitate the processing of speech input or to infer an intent of a command received at the smart home device 103. For example, in one embodiment the smart home device 103 can be a communal device that is used by multiple users within a household. Certain personal or private information for users of the communal device, such as contact information, calendar information, message data, etc., can be classified as private for a given user. To avoid storing such private information on a smart home device 103 that is a communal device or enabling a communal device to access servers containing or having access to such information (e.g., the virtual assistant server 106), the VAC 101 on the smart home device 103 can be associated with a user device 104 that can facilitate access to such information. When the VAC 101 on the smart home device 103 is to perform a command or action that requires access to private information associated with a user, the VAC 101 on the smart home device 103 can communicate with the user device 104 and/or the VAC 102 on the user device 104 to acquire information used to perform the requested command or action.

A single user can be associated with multiple user devices 104. In such circumstance, a single instance of the user device 104 may be designated as a companion device. The smart home device 103 will then communicate with the companion device to enable the processing of certain requests. For example, a user can have multiple instances of the user device 104, such as one or more smartphone devices, one or more tablet devices, or a laptop device. The user can designate one of such user devices 104 as a companion device to which the smart home device 103 will communicate to acquire access to private user information.

In some embodiments, the smart home device 103 and the user device 104 can establish and maintain a companion link 105, which is a persistent or semi-persistent connection that enables the VAC 101 on the smart home device 103 to query the user device 104 and/or the VAC 102 on the user device 104 for private information. In one embodiment, the companion link 105 is an always-connected, low-latency messaging system that enables communication between devices within a home. Such connection can be maintained locally over a LAN or can be established over a wide area network, such as the Internet. The companion link 105 can enable communal devices to redirect personal requests to a user device, such that the requests can be processed in a privacy-preserving manner. The companion link 105 can also enable general-purpose device to device messaging. In one embodiment the companion link 105 can be used to enable incoming call audio relay between the smart home device 103 and the user device 104.

FIG. 1B illustrates a companion link system 130 of FIG. 1B that enables communication between devices within the virtual assistant system 100. In various embodiments, the companion link system 130 can enable secure and authenticated message exchange between multiple devices. The multiple devices can include one or more user devices (e.g., user device 104, user device 115), which each may be a portable multifunctional device. The multiple devices can also include one or more stationary devices, such as one or more communal smart home devices (e.g., smart home device 103, smart home device 133) that may be used by multiple users. In one embodiment a set of companion links 105a-105b can enable message-based communication between a user device and one or more communal smart home devices. A companion link 105c can also be established between communal smart home devices to enable communication between those devices. In one embodiment, a companion link 105d can also be established between user devices to enable peer-to-peer exchange of device data.

In one embodiment, the set of companion links 105a-105b can be used to enable communal stationary devices to redirect personal requests to a personal device associated with a user, to enable such request to be processed in a privacy-preserving manner. For example, and in one embodiment, a user may speak a personal query, to a communal device, such as "When is my next meeting?" The personal query can be received by the VAC 101 or VAC 131 on smart home device 103 or smart home device 133. As such request makes use of the speaking person's calendar, the communal device may not have direct access to such personal data. To satisfy such a request, the communal device can redirect the query to a designated companion device, such as user device 104, to perform analysis of the query and generate an audio response that can be sent back to the communal device for playback to the user.

In addition to enabling the processing of queries in a privacy preserving manner, in one embodiment a companion link 105c can enable general purpose messaging that enables communication between communal devices, such as smart home device 103 and smart home device 133. Such link enables the communal devices to work in concert to coordinate operation. For example, smart home device 103 and smart home device 133 may be configured as part of a distributed media playback system that can play music or other media. The companion link 105c established between smart home device 103 and smart home device 133 can be used to coordinate media playback or to coordinate multi-channel audio playback over the multiple devices. When a user speaks a query to one of the smart home devices, the devices can exchange messages to coordinate ducking of audio playback for the duration of the spoken request and any associated audio responses. Using the companion link system 130, any number of communal smart home devices and user devices can communicate to exchange audio data, media playlists, configuration data, and other information used to enable a connected digital home system.

In one embodiment, companion links 105a-105d can be established over a local network connection (e.g., LAN) via a local wired and/or wireless network connection. In one embodiment, the companion links 105a-105d can also be established over a WAN connection, such as an Internet connection, although policy and configuration determinations may optionally be configured to limit the companion link 105c between smart home devices 103, 133 to a single network. In one embodiment, in addition to the virtual assistant server 106, the server system 108 can include an online user account server 136 to which user devices 104, 115 and smart home devices 103, 133 can connect via the one or more networks 110. The online user account server 136 can include information associated with an online user account of a user associated with the various devices. In some embodiments, the online user account server 136 can also include or be associated with server hardware and software logic to provide online services including online storage, messaging, e-mail, media and streaming services, or navigation services. In one embodiment, the online user account server 136 can also provide or facilitate access to one or more of the external services 120 of FIG. 1A. In one embodiment, the online user account server 136 can also provide or facilitate access to an online store, such as an online application store (e.g., app store) and/or an online media store, such as a music, video, or e-book store.

In one embodiment, a companion link 105d between user devices 104, 115 can be used to enable peer-to-peer data exchange. In one embodiment, automatic data exchanges between the devices can be configured to be performed over the companion link 105d. For example, where user device 104 and user device 115 are each associated with the same account on the online user account server 136, a credential exchange can be performed via the online account server to enable the automatic establishment of an encrypted communication channel between the devices whenever the devices are within direct communication range. In one embodiment, data for cloud services associated with the online user account server 136 can be exchanged between devices over the companion link 105d instead of over the one or more networks 110. In one embodiment, the online user account server 136 can maintain a list of devices associated with a single account or a list of devices associated with a family of associated accounts. The list of devices associated with an account of family of accounts can be used to facilitate device discovery and the establishment of companion link connections between devices. The accounts on the online account server can enable mutual authentication between the electronic devices via an exchange of authentication credentials.

In one embodiment, the online user account server 136 includes or is associated with a registration server to register a unique device identifier associated with each device with an online account associated with a user. Once a device has been registered with an online account of a user, an identifier token can be created that enables the device to be located and identified over the networks 110. The identifier token can include one or more cryptographic keys, tokens, certificates, or other data that allows the virtual assistant server 106, online user account server 136, and other servers within the server system 108 to locate and identify a device across the one or more networks 110. In some embodiments a smart home device 103, 133 can use the identifier token to establish a remote connection with the user device 104 if the user device is outside of the home or is not connected to the home network of the smart home devices. The smart home devices 103, 133 can use the identifier token to locate the user device 104 on a mobile wireless network and establish a secure remote companion link connection with the user device 104. Locating the user device 104 and establishing the connection to the user device can be facilitated in part via the virtual assistant server 106 and the online user account server 136. In such embodiments, at least a subset of the companion device functions of the user device 104 can continue to operate when the user device 104 is away from home, or if the user is at home but is not connected to the home network.

In some embodiments each virtual assistant client (VAC 101, VAC 102, VAC 131) executing on a device can be associated with a virtual assistant identifier. In various embodiments, the virtual assistant identifier can be associated with or derived from the identifier token for the host device, an account identifier associated with an online account of a user of the device, and/or another token associated with or derived from the account or device identifiers. The virtual assistant identifier of a virtual assistant client can uniquely or quasi-uniquely identify the VAC 101, 102, 131 on the various devices when the virtual assistant clients are communicating with each other or the virtual assistant server 106. The virtual assistant identifier can be associated with identification or location information of the host device of the virtual assistant, such as the identification token of the host device. After a paring relationship is created between a smart home device 103, 133 and the user device 104, the virtual assistant clients (VAC 101, VAC 131) on the smart home device can store the virtual assistant identifier and use the virtual assistant identifier to locate, identify, and communicate with the VAC 102 on the user device 104. The virtual assistant identifier for the VAC 102 can also be sent to the virtual assistant server 106 and stored as a companion virtual assistant identifier. Should the virtual assistant server 106 require access to private information of a user to perform processing operations for a request received at the VAC 101, 131 of the smart home device 103, 133, the virtual assistant server 106 can contact the VAC 102 of the user device 104 on behalf of the VAC 101, 131. The virtual assistant server 106 can then receive from the VAC 102 on the user device 104, in various embodiments, private information from the user device 104, processing results of an information processing task dispatched to the user device 104, or permission and/or access credentials to access private data on behalf of the user device 104.

In some embodiments, the server system 108 includes a relay server 126 that can be used to facilitate remote connections between a smart home device 103, 133 and the user device 104. The relay server 126 can enable a relay service that can relay companion link messages between devices in the event a local connection or another form of remote connection, such as a remote peer-to-peer connection, cannot be established. The relay server 126 can enable remote companion link message passing based on a relay pairing established between the smart home devices 103, 133 and the user device 104. Keys, certificate, and other identification and verification data associated with the various devices can be exchanged during the local pairing process that can be used to establish a relay pairing between devices. Once a relay pairing has been established between devices, the smart home devices 103, 133 can send messages to the relay server 126 with a unique relay identifier associated with the user device 104.

Each device that can connect with the relay server 126 can have an associated relay identifier, which is a persistent pairing token that can be used to identify and authenticate the connecting devices. The relay identifier can be, include, or be derived from a device identifier or identifier token that uniquely identifies the device and can include certificates and/or signatures that enable verification of the relay token. The relay server 126 can then relay the messages to the user device 104. In one embodiment, a persistent and bidirectional connection can be established, enabling the user device 104 to send return messages to the smart home device 103, 133 via the relay server 126. In one embodiment, the user device 104 can also initiate a connection with a smart home device 103, 133 using a relay identifier associated with the device. In one embodiment, relay identifiers are used for each message exchanged over the relay server 126, enabling the relay server 126 to verify the authenticity of each message relayed though the server and to prevent unauthorized devices from transmitting messages via an established relay server connection.

Figure 2:
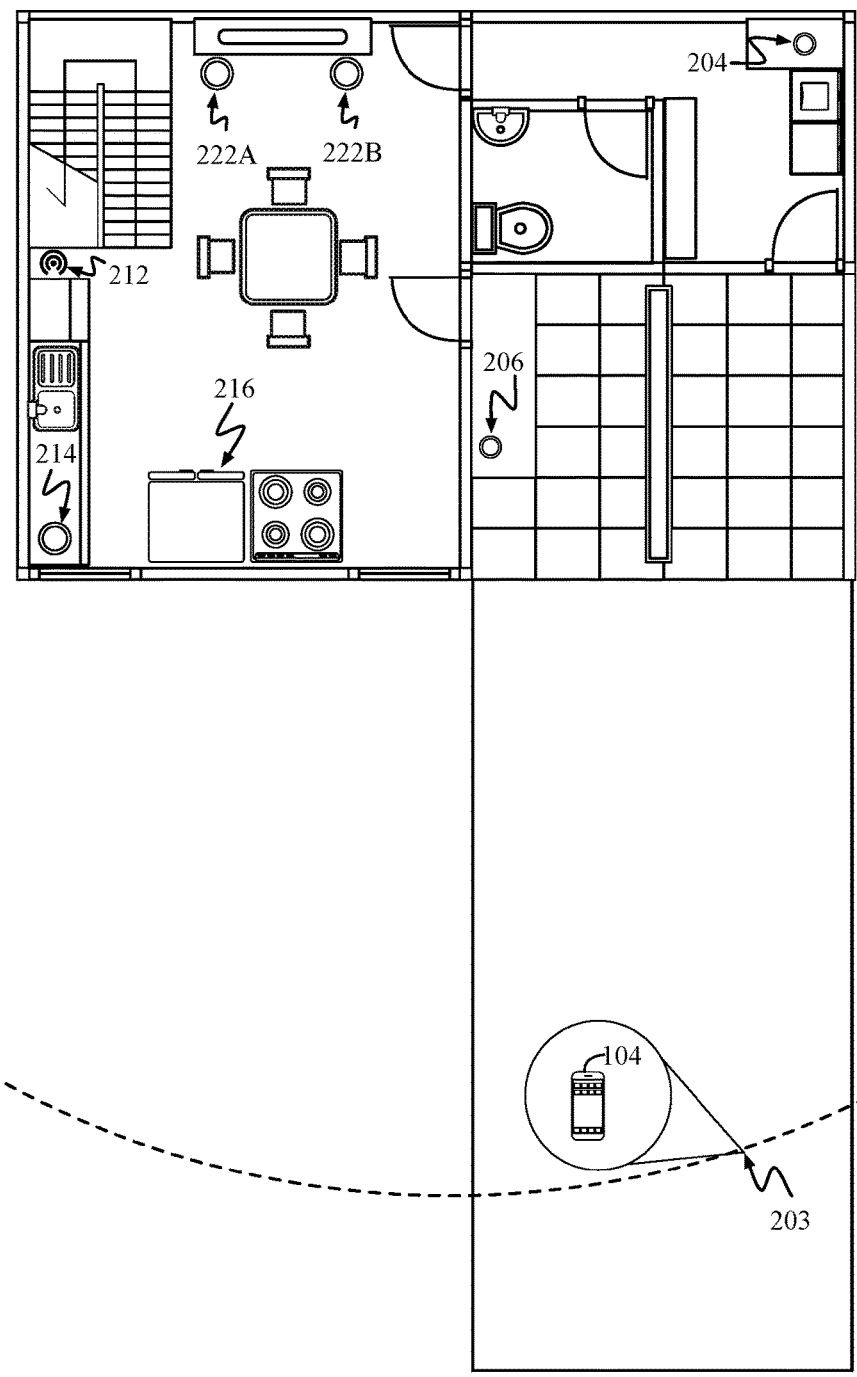
FIG. 2 illustrates a home network environment including multiple smart home devices, according to embodiments.

FIG. 2 illustrates a home network environment 200 including multiple smart home devices, according to embodiments. The home network environment 200 can include a wireless access point 212 to provide access to a wireless network that services the home network environment. The home network environment 200 can be part of a smart home environment. Multiple smart home devices 204, 206, 214, 216, 222A-222B can be connected to the network environment 200 via the wireless network, or optionally a wired network connection. In various embodiments, the home network environment can include various types of smart home devices. For example, smart home device 204, 206, 214, can be smart speaker devices that are configured to distributed media playback. Additionally, smart home device 216 can be a smart appliance device, such as a smart refrigerator device. Each of the smart home devices 204, 206, 214, 216, 222A-222B can use the network of the home network environment 200 to establish interconnecting companion links to enable the devices to exchange configuration information. For example, smart home devices 222A-222B can be configured as multi-channel smart speaker devices, which can use the companion link to configure multi-channel (e.g., stereo, surround, etc.) audio playback. Additionally, each of the smart home devices 204, 206, 214, 216, 222A-222B can include virtual assistant clients which, in the event of a request that requires access to private user information, can interact with a designated companion device over a companion link to facilitate processing of the request. User devices such as a mobile instance of the user device 104 or a connected vehicle infotainment system, can also be configured to connect to the home network environment when in proximity to the wireless access point 212. In one embodiment the user device 104 can also create a companion link connection to any other user devices that may be connected to the home network environment 200 or within direct radio range of the user device 104.

Device and Companion Discovery

Before a companion link communication channel is established between a user device 104 and a smart home device 204, 206, 214, 216, 222A-222B, a companion discovery and pairing process is performed. The companion discovery process enables a smart home device to locate a companion device through which the virtual assistant client (e.g., VAC 101, 131 as in FIG. 1A-1B) on the smart home device is to access private user information that may be used to process and/or respond to a user request. The companion discovery process, in some instances, can also include user verification that communication between the smart home device and the companion device should occur. In some embodiments, companion discovery can leverage existing service discovery protocols that facilitate locating devices and/or services on a wireless or other network, such as the Simple Service Discovery Protocol (SSDP) developed by the UPnP Forum or the Bonjour networking technology developed by Apple Inc. (published as IETF RFC 6762 and IETF RFC 6763 and referred to herein as "Bonjour"). In a device discovery service, a device can advertise information indicating its existence, address, and optionally additional information about its capabilities. Other devices, including other smart home devices or user devices, can browse the advertisements and identify devices of interest based on the broadcast information. Using the advertised address, a browsing device can initiate communication with the advertiser.

Depending on the network and discovery service, advertising can optionally include real-time broadcasting of information (e.g., through a multicast or beacon signal) and/or providing advertisement information to a central repository (e.g., at a network access point) from which other devices can retrieve the information. Browsing of advertisements can include detecting broadcast advertisements and/or retrieving advertisement information from the central repository. In some embodiments, communal smart home devices that are stationary attached to a power source, such as an electrical outlet, can continuously perform advertisement and discovery for the companion link service. Mobile user devices can enable discovery of the companion link service based on the location of the user device. For example, and in one embodiment, a geo-fence boundary 203 is configured on the mobile device, such that companion link discovery is enabled when the mobile device is within a geographic proximity to a location designated as the home location of the user device 104.

When a communal smart home device is discovered by a user device acting as a companion device (e.g., user device 104), a network data connection (e.g., TCP, UDP, etc.) can be established between the communal smart home device and the companion device. The network data connection can be established using any network layer (e.g., layer 3) protocol. To avoid connection races between devices that are both advertising and discovering, the device with the lexicographically lower persistent identifier initiates the connection between devices. The persistent identifier of a device is derived from an anonymized identifier that is advertised via the discovery service. In one embodiment, to derive the persistent identifier based on advertised information make use of data exchanged via a previously performed pairing process. In such embodiment, a data connection cannot be established with a smart home device until the smart home device is paired with a user device, as the persistent identifier used to connect with a communal smart home device is otherwise unknown. Once a data connection is established, a secure communication session can be established between the communal smart home device and the companion device. The communal smart home device and the connected companion device can then exchange presence and reachability information. Where the companion device is a mobile device, the companion device can then enter a wake-on-wireless (WoW) state as needed, when data is not being exchanged over the companion link, while communal devices that are connected to a power source can remain active to reduce first-message latency.

In the event connectivity is lost between devices, the discovery service can be re-enabled and used to search for the device on the local network. If the missing device is re-discovered, the data connection between devices can be re-established. If the missing device cannot be discovered, state discovery service information in the records of the missing device is reconfirmed and cleaned. The searching device can then attempt to establish communication with the missing device via a secure internet session. In one embodiment, part of the presence and reachability information exchanged when establishing a data connection includes a device identifier, identifier token, relay identifier, or another form of identification token that can be used to reach or enable message exchange with the missing device, for example via a peer-to-peer or relayed Internet connection. If a secure Internet connection can be successfully established with the previously missing device, companion link messages can be exchanged over the secure Internet connection.

In the event a companion device is connected to a smart home device via an Internet-based connection and a local connection becomes available, the companion link connection can be switched to the local connection. For example, user device 104 can cross a geo-fence boundary 203 an enable a discovery protocol (e.g., SSDP, Bonjour, etc.) to search for devices (e.g., smart home devices 204, 206, 214, 216, 222A-222B). Should the user device 104 discover the availability of a local connection to the smart home device to which the user device 104 is connected to over the Internet connection, the user device can transition the Internet connection to a local (e.g., Wi-Fi) connection. In one embodiment, connection switching can be performed whenever connectivity is lost between connected devices (e.g., the user device 104 leaves the home network environment 200) or if the devices determine that a better connection is available (e.g., the user device 104 returns to the home network environment 200). Local connections can be preferred to Internet connections, as local connections presumably are lower latency. Additionally, it may be less resource intensive from a device and infrastructure standpoint to maintain a local connection instead of an Internet connection.

Incoming Call Relay Secured via Embedded Audio Passcode

Figure 3A:
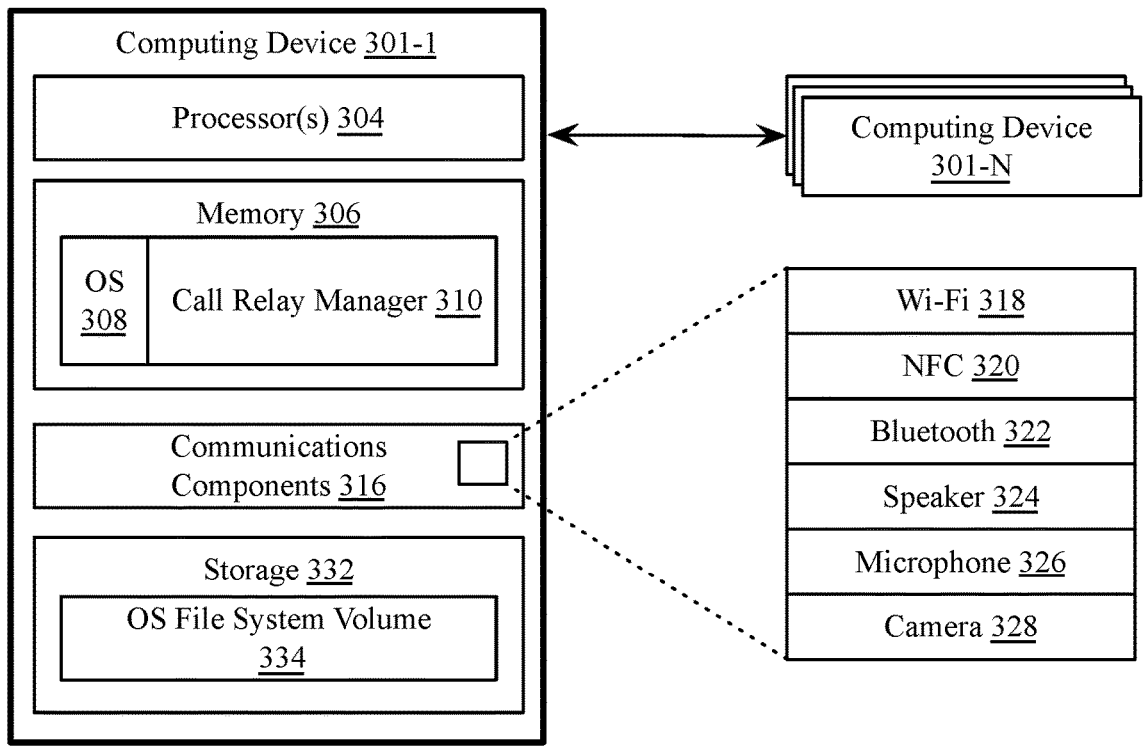
FIG. 3A-3B illustrate devices and a system to enable incoming call relay to a secondary device, according to embodiments.
Figure 3B:
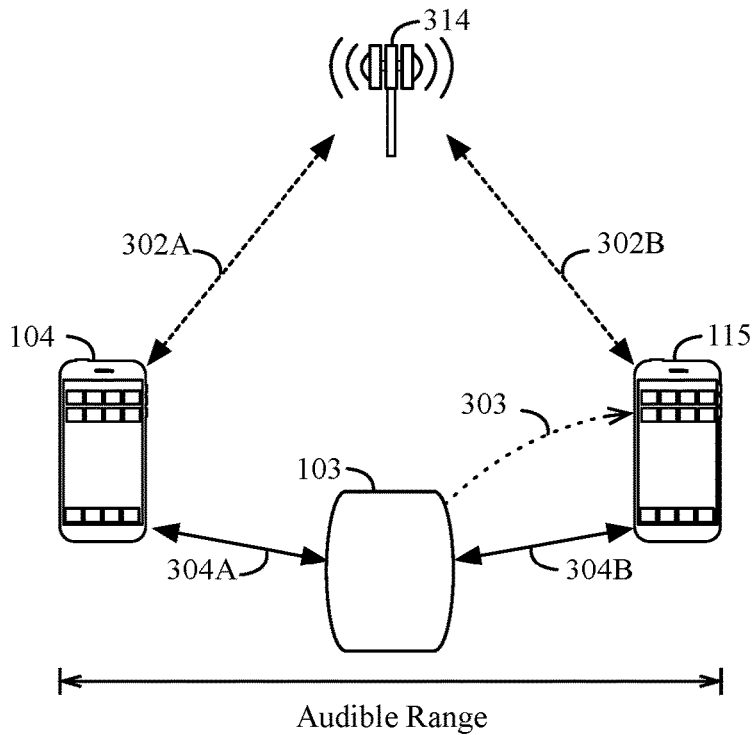

FIG. 3A-3B illustrate devices and a system to enable incoming call relay to a secondary device, according to embodiments. FIG. 3A illustrates a block diagram of computing devices 301-1-301-N (collectively computing device 301) that can be configured to implement various aspects of incoming call relay as described herein, according to some embodiments. FIG. 3B illustrates a system that enables smart home device, or another secondary or peripheral device, to accept an incoming cellular audio call on behalf of a cellular enabled device, such as a smartphone.

As shown in FIG. 3A, a computing device 301 can include at least one processor 304, at least one memory device 306, and at least one non-volatile storage device 332. According to some embodiments, the at least one processor 304 can be configured to work in conjunction with the at least one memory device 306 and the at least one non-volatile storage device 332 to enable the computing device 301 to implement the various techniques set forth herein. According to some embodiments, the at least one non-volatile storage device 332 can represent a storage entity that is accessible to the computing device 301, e.g., a hard disk drive, a solid-state drive, a mass storage device, a remote storage device, a storage service, and the like. For example, the at least one non-volatile storage device 332 can be configured to store an operating system (OS) file system volume 334 that can be mounted at the computing device 301, where the operating system (OS) file system volume 334 includes an OS 308 that is compatible with the computing device 301.

According to some embodiments, the OS 308 can enable a call relay manager 310 to execute on the computing device 301. It will be understood that the OS 308 can also enable a variety of other processes to execute on the computing device 301, e.g., OS daemons, native OS applications, user applications, and the like. According to some embodiments, the call relay manager 310 on a computing device 301 can be configured to interface with another call relay manager 310 on a peripheral computing device to perform the techniques described herein. The peripheral computing device can be another instance of the computing device (e.g., computing device 301-N). According to some embodiments, the call relay manager 310 on the computing device 301-1 can send messages to configure incoming call relay to a call relay manager 310 on the peripheral computing device 301-N. The call relay manager 310 of a given computing device 301 can be configured to manage paired device information that enables the call relay manager 310 to identify other related computing devices 301 with which the computing device 301 has previously paired. For example, the paired device information can include, for each other computing device 301 with which the computing device 301 previously paired, a unique identifier (ID) associated with the computing device 301, one or more encryption keys associated with the computing device 301, and so on. In one embodiment, incoming call relay can be performed automatically by a smart home device that is paired with a smartphone device.

In one embodiment the call relay manager 310 can also detect and/or discover whether ad-hoc call relay can be enabled for a computing device 301 that is not paired with a secondary computing device or smart home device that can perform an incoming call relay. Detection can be performed, for example via a scan performed using one or more wireless radios, such as a Wi-Fi or Bluetooth radio. A computing device 301-2 configured as a secondary or smart home device can advertise the capability to perform ad-hoc incoming call relay and the call relay manager 310 of a nearby computing device 301-1 can be configured to ring computing device 301-2 upon receipt of an incoming call.

In some embodiments, the detection and/or discovery process can leverage existing service discovery protocols that facilitate locating devices and/or services on a wireless or other network, such as the Simple Service Discovery Protocol (SSDP) developed by the UPnP Forum or the Bonjour networking technology developed by Apple Inc. (published as IETF RFC 6762 and IETF RFC 6763 and referred to herein as "Bonjour"). In a device discovery service, a device can advertise information indicating its existence, address, and optionally additional information about its capabilities. Other devices can browse the advertisements and identify devices of interest based on the broadcast information. Using the advertised address, a browsing device can initiate communication with the advertiser. Depending on the network and discovery service, advertising can include real-time broadcasting of information (e.g., through a multicast or beacon signal) and/or providing advertisement information to a central repository (e.g., at a network access point) from which other devices can retrieve the information. Browsing of advertisements can include detecting broadcast advertisements and/or retrieving advertisement information from the central repository. In some embodiments, electronic devices that are attached to a power source, such as an electrical outlet, can continuously perform advertisement and discovery for the incoming call relay service described herein.

The OS 308 can be configured to enable the call relay manager 310 to interface with a variety of communications components 316 that are included in or accessible to the computing device 301. The computing device 301 can use these communications components to discover devices capable of participating in an incoming call relay and provide communication channels over which call data can be relayed. The communications components 316 can include, for example, a Wi-Fi interface 318, a Near Field Communication (NFC) interface 320, a Bluetooth interface 322. Audio data can be played over at least one speaker 324. The audio data can include an embedded audio code when establishing a data connection for the incoming call relay on a secondary or smart home device (e.g., computing device 301-2). Once the data connection is established, telephone call audio data can be played over the at least one speaker 324. At least one microphone 326 can be used to establish a secure ad-hoc connection on a smartphone or other cellular enabled device (e.g., computing device 301-1) that hears an embedded audio code played by a speaker of a secondary or smart home device. On the secondary or smart home device, the at least one microphone 326 can be used to receive audio from a local participant in the telephone call. The communications components can also include at least one camera interface 328.

The communications components 316 can further include components not illustrated in FIG. 3A or FIG. 3B. For example, the communications components 316 can include an Ethernet interface, display interfaces, input interfaces (e.g., buttons, touch surfaces, dials, etc.), and so on. It is noted that these examples are not meant to represent an exhaustive list in any manner, and that any form of communication interface can be included in the communications components 316. For example, the communications components 316 can include Global Positioning System (GPS) interfaces that can enable the computing devices 301 to identify when they are in proximity to one another. This can provide, for example, an additional level of security with respect to identifying when users are may utilize their computing devices 301 to engage in the incoming call relay procedures described herein with other computing devices 301. Furthermore, a smartphone instance of the computing device 301 can include a cellular interface, while an instance of the computing device that corresponds to a secondary device, peripheral device, or smart home device may lack a cellular interface.

As shown in FIG. 3B multiple cellular enabled devices (e.g., user device 104, user device 115) having a connection 302A-302B to a cellular voice network 314 can be configured to ring a smart home device 103 when within wireless and audible range of the smart home device. The smart home device 103 may lack cellular capability but include a Wi-Fi, Bluetooth, or another wireless radio though which data connections 304A-304B can be established with the user devices. The data connections 304A-304B can be established via a network infrastructure, such as a Wi-Fi connection that is established with a wireless access point or router. The data connections 304A-304B can also be direct data connections, such as Wi-Fi direct or Bluetooth data connections.

To enable a user to answer an incoming telephone call via the smart home device 103, an encrypted data channel can be established over the data connections 304A-304B between the user device (e.g., one of user device 104 or user device 115) that is receiving the incoming call and the smart home device 103. The encrypted data channel can then be used to exchange incoming and outgoing audio. When one of user device 104 or user device 115 is within a threshold range of the smart home device 103 and receives an incoming cellular call, the user device can send a signal to the smart home device 103 to notify the smart home device that the particular user device has an incoming call.

Upon receipt of the incoming call signal from a user device 104, 115, the smart home device 103 can ring or play an incoming call notification tone. The smart home device 103 can ring the call, for example, by playing an incoming call notification tone that is specific to the user device 104, 115 that is receiving the call. In one embodiment, the smart home device 103 can play the specific ringtone that would otherwise play if the incoming call were to ring on the user device. For example, the call notification tone received from the user device 104, 115 can include an index or identifier to a ringtone within a list of ringtones shared between the user device and smart home device 103. Where the user device 104, 115 is configured to play a custom ringtone, the data or audio for the custom ringtone can be streamed to the smart home device 103. In one embodiment, the smart home device 103 can announce the name of a user associated with the user device 104, 115 that is receiving the incoming call. In one embodiment the smart home device 103 can be configured to announce a name associated with the user device 104, 115 that is receiving the call.

An encrypted data channel can be established, for example, using a companion link connection between the smart home device 103 and the user device 104, 115 if the user device has paired with or otherwise authenticated with the smart home device 103. To enable an encrypted data channel to be established on an ad-hoc basis, the smart home device 103 can encode a seed identifier 303 into an audio signal that is played via the speaker of the smart home device 103 to announce the incoming call. In one embodiment the seed identifier 303 can be encoded into the ringtone or call announcement audio. In one embodiment the seed identifier 303 can be encoded into an audio signal and the audio signal can be mixed into the ringtone or call announcement that is played by the smart home device 103.

When user device 115 receives an incoming call, the user device can signal the smart home device 103 to notify the smart home device of an incoming call. The signal for the incoming call can be sent directly to the smart home device 103 or can be a broadcast or multicast message that is sent over the data connection 304B. While a single smart home device 103 is shown, the user device 115 can broadcast a notification that may be received by multiple smart home devices, causing the multiple smart home devices to play a ringtone with a mixed or embedded seed identifier 303. The user device 115 can listen for the call notification that is played by the smart home device 103 and extract the embedded seed identifier 303 from the audio signal. The seed identifier 303 can include an identifier for the smart home device 103, enabling the user device 115 to identify the specific smart home device 103 that is playing the call announcement. The identifier for the smart home device 103 can be a hardware identifier or a network identifier. The seed identifier 303 can also include a cryptographic seed or nonce that will can be used by the smart home device 103 and the user device 115 to generate encryption keys or key material from which encryption keys can be derived. The encryption keys can be used to encrypt audio data relayed over the data connection 304B between the smart home device 103 and the user device 115. A user can answer a ringing incoming call at the smart home device 103 via an interface on the smart home device, such as a physical button or a touch interface, such as a touchscreen. In one embodiment, a user can answer an incoming call via a virtual assistant voice command such as "answer my call in the living room."

Once the user answers the incoming call, a voice conversation can be performed at the smart home device 103, with the incoming and outgoing audio of the call exchanged with the user device 115 over an encrypted channel established over the data connection 304B. It will be noted that in addition to the encryption performed for call audio, the data connection 304B may also be encrypted using other means, such as via encryption provided by Wi-Fi, Bluetooth, or any other communication mechanism over which the data connection 304B is established.

Figure 4:
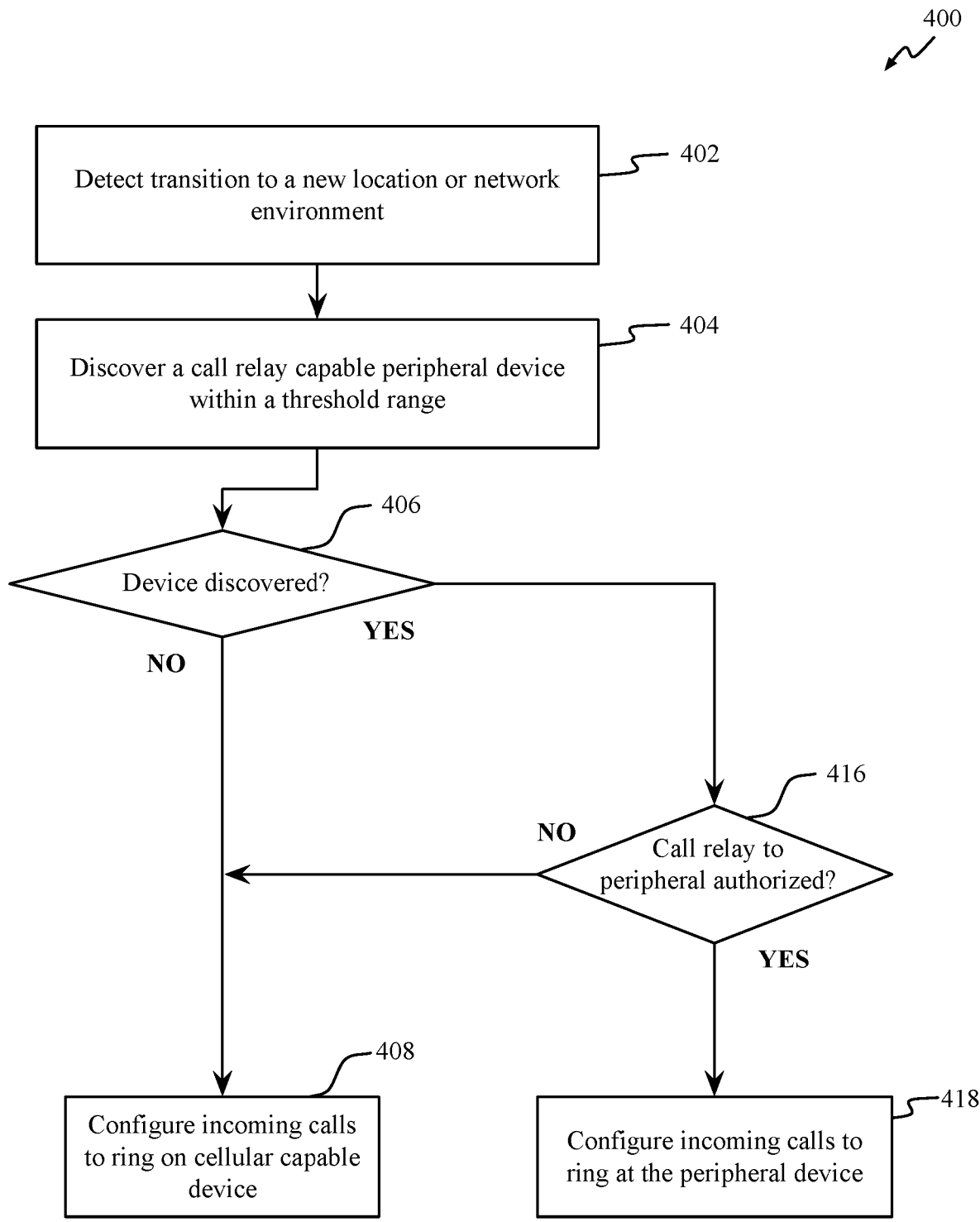
FIG. 4 is a flow diagram illustrating a method to determine a ringing device for an incoming telephone call, according to embodiments described herein.

FIG. 4 is a flow diagram illustrating a method 400 to determine a ringing device for an incoming telephone call, according to embodiments described herein. The method 400 can be performed by a user device as described herein, such as a smartphone device or any other electronic device having cellular voice and local data networking (e.g., Wi-Fi, Bluetooth, etc.) capability.

In one embodiment, method 400 includes for the cellular voice capable device to detect a transition to a new location or network environment (block 402). Detecting a transition to a new network environment can include joining a new local area network (LAN), for example, via a Wi-Fi access point. Detecting a transition to a new location can be performed via a global positioning system receiver or wireless radio-based location services. In one embodiment, known geographic locations can be configured for the cellular voice capable device, such as a pre-configured home or work location. Device behavior can be configured to adjust upon arrival to a pre-configured location.

Method 400 additionally includes for the cellular voice capable device to discover a call relay capable peripheral device within a threshold range (block 404). Discovery of a call relay capable device can be performed using a service discovery protocol that facilitates locating devices and/or services on a wireless or other network, such as but not limited to SSDP or Bonjour. The service discovery protocol can detect a call relay service capability that is advertised by the call relay capable device. The threshold for the range can correspond with a pre-determined distance from the call relay capable device, which is related to a distance in which the cellular voice capable device can receive an audio signal played via a speaker of the call relay capable device. In one embodiment, the threshold range can also correspond with a wireless radio range, for example, if a direct wireless connection (e.g., Wi-Fi direct, Bluetooth, etc.) is to be established with the call relay capable device. A range to the relay capable peripheral device can be determined via, for example, received signal strength indication (RSSI) or a secure wireless ranging technique. In some embodiments the cellular voice capable device and the call relay capable device can handshake during the discovery process to determine certain parameters of an incoming call relay. For example, a passcode carrier frequency can be determined during discovery, in one embodiment.

If a call relay capable device is not discovered (block 406), method 400 includes for the cellular voice capable device to configure incoming calls to ring locally on the cellular voice capable device (block 408). If a call relay capable device is discovered at block 406, method 400 incudes for the cellular voice capable device to determine whether call relay to the peripheral is authorized (block 416).

In one embodiment, a wireless handshake can occur between the cellular voice capable device and the call relay capable peripheral device after initial discovery. If the call relay capable peripheral device is configured to allow all devices within range to use the peripheral device for incoming call relay, then any cellular voice capable device is authorized, including paired and ad-hoc devices. Alternatively, the peripheral device may be configured to allow incoming call relay only for paired devices, only for LAN connected devices, only for ad-hoc devices, or only for whitelisted ad-hoc devices. Paired devices can be devices that are paired with the peripheral such that secure communication can be performed over a companion link, where companion link connections can be direct or network-based connections. LAN devices may be authorized on the basis of the ability for the cellular voice capable device to connect to the same local area network as the call relay enabled peripheral. Ad-hoc incoming call relay can be allowed to enable any cellular voice capable device within range to use the call relay capable peripheral device to accept incoming calls. Whitelisted ad-hoc devices can be devices that are explicitly authorized by a configured owner of the peripheral device. Whitelisted devices can be detected, for example, based on a device identifier, cryptographic key, certificate, network hardware address, or another identifier that is associated with the whitelisted cellular voice capable device. If the cellular voice capable device is not authorized at block 416, then the device will configure incoming calls to ring on-device at block 408. If the cellular voice capable device is authorized to relay incoming calls to the peripheral device, method 400 includes for the cellular voice capable device to configure incoming calls to ring at the peripheral device (block 418).

Figure 5:
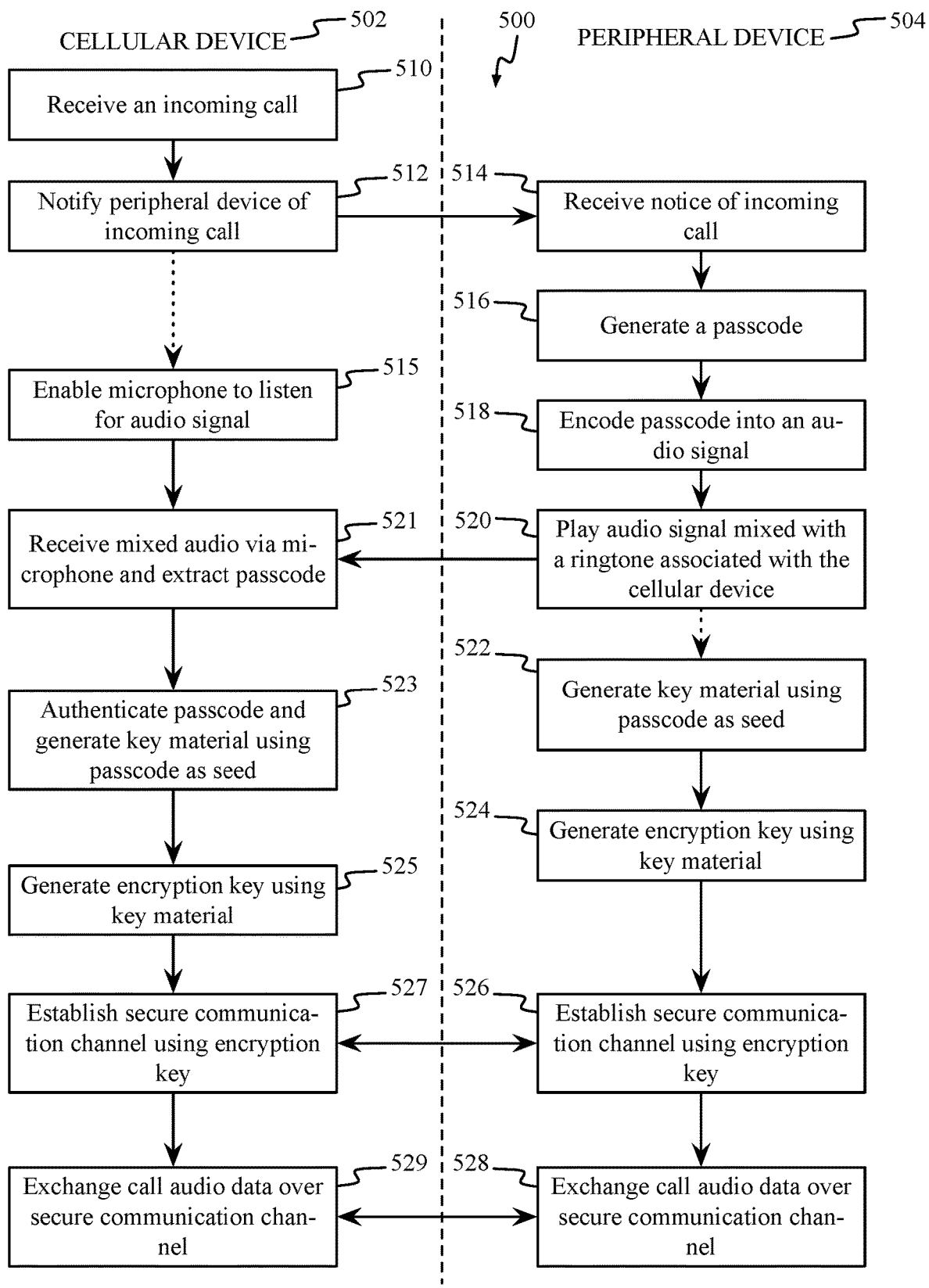
FIG. 5 is a flow diagram illustrating a method to establish an audio relay for an incoming call via a passcode embedded within an audio signal, according to an embodiment.

FIG. 5 is a flow diagram illustrating a method 500 to establish an audio relay for an incoming call via a passcode embedded within an audio signal, according to an embodiment. Method 500 can be performed by a cellular device 502 and a peripheral device 504 as described herein, where the cellular device 502 is a cellular voice capable device having a cellular baseband modem, radio, and antenna, as well as a microphone device and a local data or network interface. The peripheral device 504 is an incoming call relay capable device as described herein, such as a smart home device or another electronic device having a non-cellular voice capable wireless radio, such as Wi-Fi and/or Bluetooth, as well as one or more speakers and microphone devices.

The cellular device 502 can receive an incoming call (block 510) via a connection to a cellular voice network. The cellular device 502 can then notify a detected peripheral device of an incoming call (block 512). The cellular device 502 can notify the detected peripheral device via a variety of mechanisms, including a short-range wireless radio transmission or a message sent via a network connection. In one embodiment, the message to notify the detected peripheral device can include information about the cellular device 502, such as a device identifier, a configured ringtone, or a nonce value.

The peripheral device 504 can receive the notice of the incoming call (block 514), including any information sent along with the notice. The peripheral device 504 can then generate a passcode (block 516) and encode the passcode into an audio signal (block 518). The passcode length can vary across embodiments. In one embodiment, for example, the passcode may be a multi-digit code value. In one embodiment, the passcode may be a complex cryptographically generated alphanumeric sequence. In one embodiment, the passcode may be generated based on an identifier, nonce, or other information received along with the notice of the incoming call. In one embodiment, an identifier for the peripheral device 504 can be appended to or encoded within the passcode.

The passcode can be encoded into an audio signal using one or more audio encoding techniques. Various techniques of audio modulation and demodulation may be used. For example, frequency or amplitude modulation may be performed to encode the passcode into the audio signal. In one embodiment a phase modulated audio signal can be used to encode the passcode. In various embodiments, audible or inaudible audio frequencies may be used. For example, in one embodiment the audio signal may be an ultra-sonic or sub-sonic signal that is above or below the frequencies that are audible to human hearing. In one embodiment the audio signal may be generated at an audible frequency. For audible frequency audio signals, the frequencies used for the generated audio signal are frequencies that are selected so as to not interfere with frequencies used for ringtones or call announcement audio. In one embodiment, audible audio signals may be masked using psychoacoustic masking, such that the resulting signal will be difficult to detect by human listeners, but detectable by the microphone of the cellular device 502. In one embodiment, one or more speakers of the peripheral device 504 and one or more microphones of the cellular device may be able to generate and receive audio in a specific ultra-sonic or sub-sonic frequency range. In such embodiment, the audio signal may be generated and modulated within that specific frequency range.

The peripheral device 504 can then play the audio signal mixed with a ringtone associated with the cellular device 502 (block 520). The ringtone for the cellular device can be determined based on a ringtone identifier received with the notice of the incoming call, where the identifier identifies a ringtone within a set of ringtones stored on the peripheral device. In one embodiment, where the cellular device 502 is configured to use a custom ringtone, audio or data for the ringtone can be streamed from the cellular device 502 to the peripheral device 504. The peripheral device 504 can then play an audio mix of the custom ringtone and the audio signal including the encoded passcode. In one embodiment, the mixing process for the audio signal and the ringtone can be done in a way to mask or obscure the audio signal to human listeners while allowing the encoded passcode to be decoded by the cellular device 502. In one embodiment, instead of playing an audio signal mixed with the ringtone, the mixing process can include encoding the passcode into the ringtone to generate a passcode encoded ringtone. The peripheral device 504 can then play the passcode encoded ringtone.

The cellular device 502, after sending the notification to the peripheral device of the incoming call (block 512) can enable a microphone to listen for an incoming audio signal (block 515). The cellular device 502 can receive the mixed audio signal via the microphone and extract the passcode (block 521). The passcode can be extracted by demodulating the audio signal. In various embodiments, the audio signal can be demodulated to extract the passcode.

At some point after the peripheral device 504 generates the passcode (block 516), the peripheral device 504 can generate key material using the passcode as a seed (block 522). The key material can be one or more data elements that are used by a cryptographic algorithm that executes on a processor (e.g., a secure processor) on the peripheral device to generate or derive an encryption key (block 524). Various encryption schemes can be used, including but not limited to public-key cryptosystems, symmetric-key cryptosystems, or hybrid cryptosystems including but not limited to the integrated encryption scheme (IES) or the elliptic curve integrated encryption scheme (ECIES).

After extracting the passcode (block 521), the cellular device 502 and also generate key material using the passcode as a seed (block 523) and generate an encryption key using the key material (block 525). In one embodiment, before the key material and encryption key is generated, the cellular device 502 can authenticate the passcode. Authenticating the passcode can be performed as an integrity check on the passcode and/or as a method or verifying the authenticity of the peripheral device. In one embodiment, an identifier of the peripheral device 504 can be appended to the passcode or encoded within the passcode, creating a seed identifier that identifies the peripheral device and provides entropy for use in generating cryptographic material. In such embodiment, the cellular device 502 can determine the authenticity of the peripheral device 504 based on the identifier. In one embodiment, the audio signal frequency over which the passcode is transmitted can be dynamically determined at least in part by the cellular device 502. For example, the cellular device 502 and the peripheral device 504 can agree on a frequency a handshake process that is performed during the discovery phase. For example, a frequency or frequency range for the audio signal can be selected by the cellular device 502 and transmitted to the peripheral device 504 during the notification of incoming call (block 512). In such embodiment, the encoding of the passcode by the peripheral device 504 at a frequency or within a frequency range selected by the cellular device 502 is an additional verification to the cellular device of the authenticity of the peripheral device 504. Alternatively, the frequency for the audio signal can be negotiated during a handshake process performed between the cellular device 502 and the peripheral device 504. In one embodiment, a frequency for the audio signal can be determined during the advertisement/discovery process.

With the appropriate encryption keys generated, the cellular device 502 and the peripheral device 504 can establish a secure communication channel using the encryption keys (block 527, block 526). Over this secure communication channel, the cellular device 502 and the peripheral device 504 can exchange call audio data (block 529, block 528). In one embodiment the secure communication channel is established before a user indicates to the peripheral device 504 to answer the incoming call, to reduce the perceived call setup latency after the user indicates to answer the call. A user can use an interface (physical button, touch interface, etc.) on the peripheral device 504 to answer and conduct the telephone call. A similar interface can be used to end the telephone call. If the user intends to transfer the telephone call back to the cellular device 502, or to another audio device, in various embodiments the user may do so via an interface on the cellular device 502 and/or the peripheral device 504.

Figure 6:
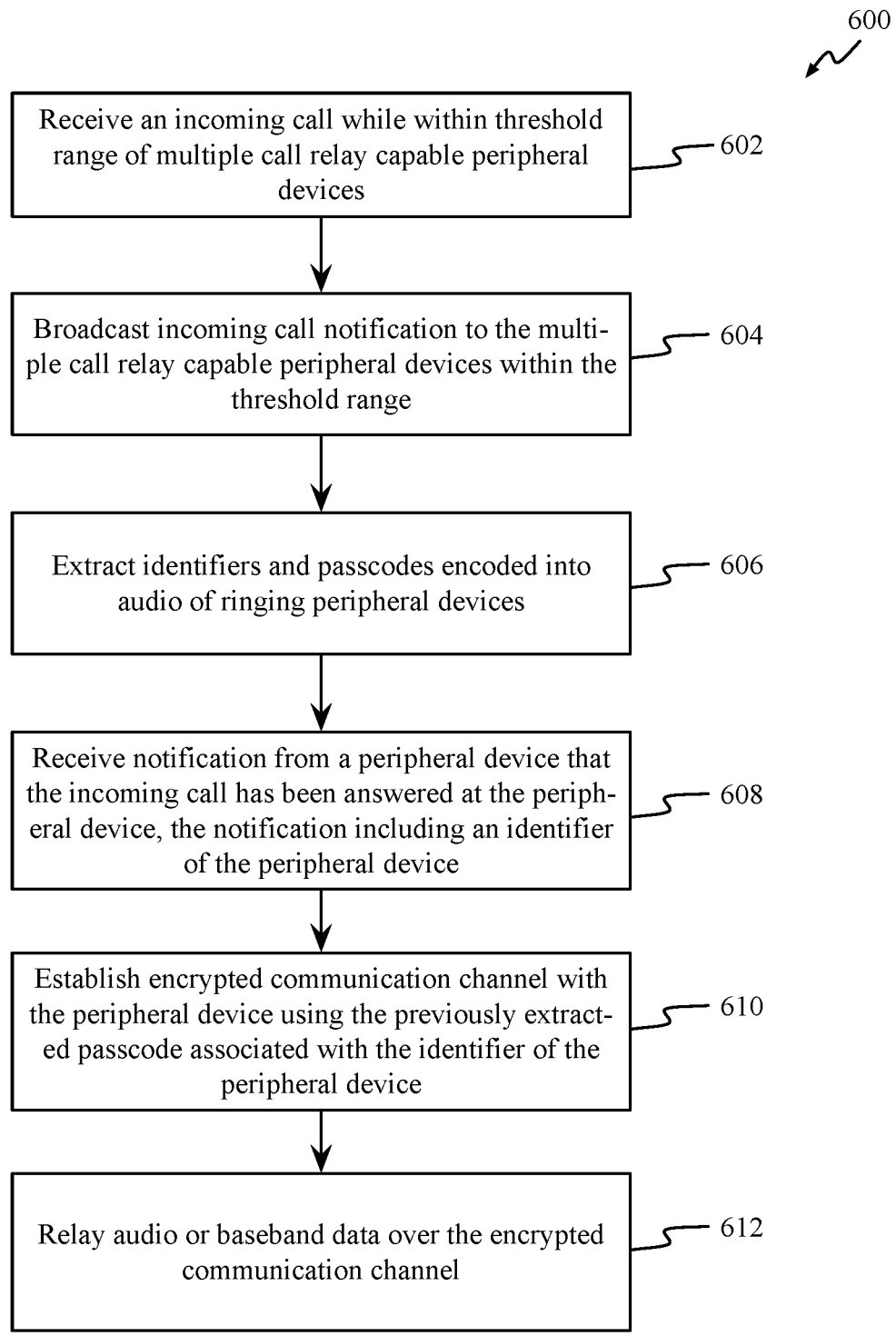
FIG. 6 illustrates a method of enabling incoming call relay to one of multiple peripheral devices, according to an embodiment.

FIG. 6 illustrates a method 600 of enabling incoming call relay to one of multiple peripheral devices, according to an embodiment. Method 600 can be performed by a cellular voice and local data network capable device as described herein, such as a smartphone device. Operations can be performed at least in part via a call relay manager as described herein, such as call relay manager 310 of FIG. 3.

Method 600 includes for the cellular voice capable device to receive an incoming call while within threshold range of multiple call relay capable devices (block 602). The cellular voice capable device can then broadcast incoming call notification to the multiple call relay capable peripheral devices within the threshold range (block 604). One or more of the peripheral devices can play a call announcement or ringtone in response to the broadcast notification, where the audio played by each of the one or more devices includes an embedded passcode and identifier. The cellular voice capable device can then extract identifiers and passcodes encoded into the audio of the ringing peripheral devices (block 606). For example, the After a user answers a call at a peripheral device, method 600 includes for the cellular voice capable device to receive a notification from a peripheral device that the incoming call has been answered at the peripheral device (block 608). The notification can include an identifier of the peripheral device. The cellular voice capable device can then establish an encrypted communication channel with the peripheral device using the previously extracted passcode associated with the identifier of the peripheral device (block 610).

Figure 7:
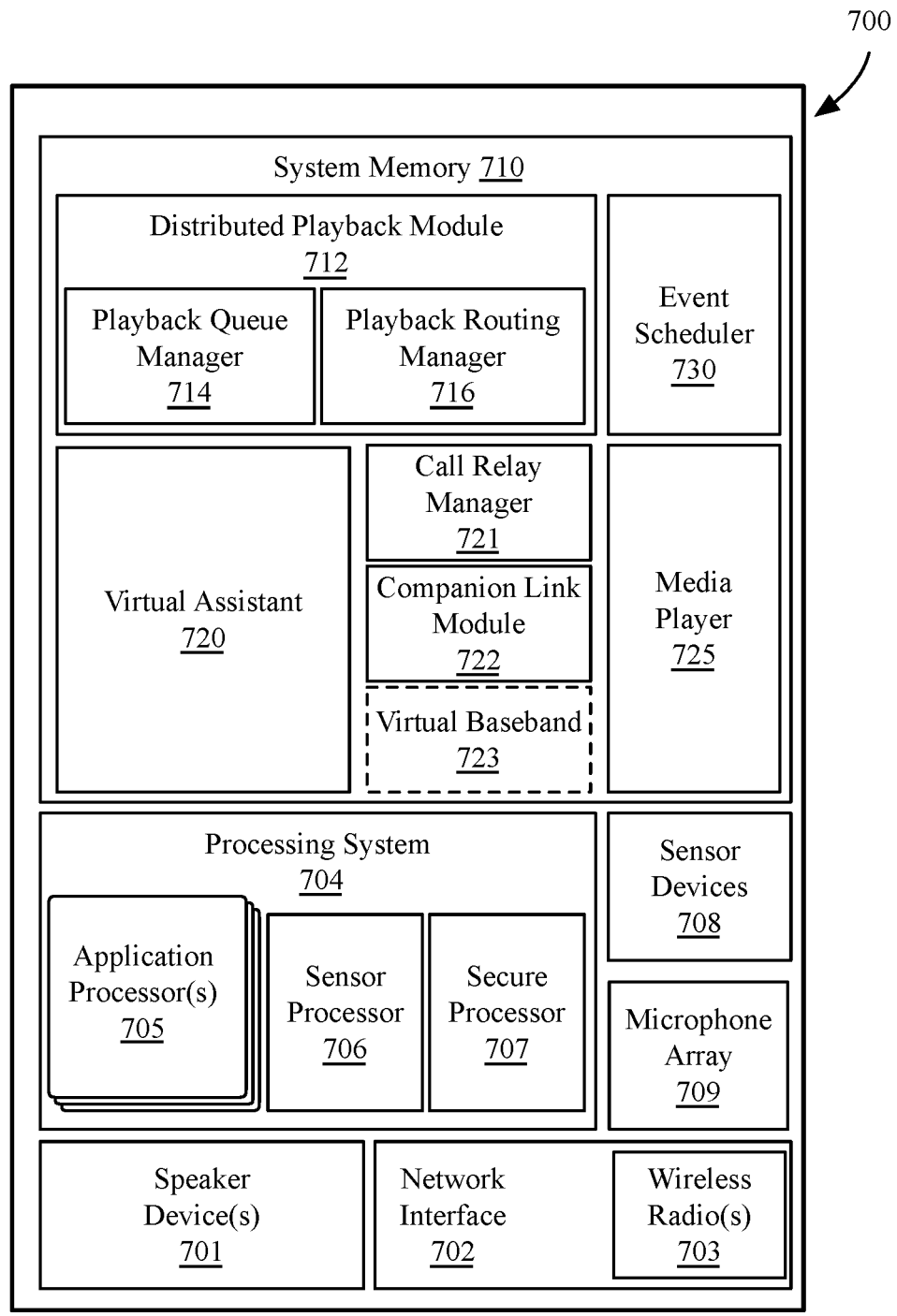
FIG. 7 is a block diagram of a computing device for use within a secondary device capable of incoming call audio relay, according to an embodiment.

The cellular voice capable device can then relay audio or baseband data over the encrypted communication channel (612). To relay audio data, the cellular voice capable device can encode incoming data received from the remote call participant over the cellular Computing Device for a Smart Home Device FIG. 7 is a block diagram of a computing device 700 for use in a smart home device, according to an embodiment. The computing device 700 includes one or more speaker device(s) 701 to enable media playback. Where the computing device 700 is implemented as a smart speaker device, the speaker device(s) 701 may be of higher quality relative to when the computing device is implemented as a user device or a smart appliance.

The computing device 700 includes a network interface 702 that enables network communication functionality. The network interface 702 can couple with one or more wireless radio(s) 703 to enable wireless communication over one or more wireless networking technologies such as, but not limited to Wi-Fi and Bluetooth. In some implementations, the network interface 702 may also support a wired network connection. The computing device also includes a processing system 704 having multiple processor devices, as well as a system memory 710, which can be a virtual memory system having an address space that includes volatile and non-volatile memory.

In one embodiment, the processing system 704 includes one or more application processor(s) 705 to execute instructions for user and system applications that execute on the computing device 700. The processing system can also include a sensor processor to process and monitor a suite of sensor devices 708 having sensors including, but not limited to motion sensors, light sensors, proximity sensors, biometric sensors, audio sensors, and image sensors (e.g., cameras). In addition to audio sensors, the computing device can also include a microphone array 709 to perform advanced acoustic sensing. The sensor processor 706 can enable low-power monitoring of always-on sensors within the suite of sensor devices 708. The sensor processor 706 can allow the application processor(s) 705 to remain in a low power state when the computing device 700 is not in active use while allowing the computing device 700 to remain accessible via voice or gesture input to a virtual assistant 720. In one embodiment, the sensor processor 706 or a similar low power processor within the processing system can enable low power processing of media instructions provided by a media player 725. The media player 725 may be a modular media player that is capable of playback of a variety of different audio and/or video media types, including but not limited to MPEG-2, MPEG-4, H.264, and H.265/HEVC. In one embodiment, other formats may be supported via additional CODEC plugins. The computing device can optionally include a display device (not shown) or can output video to other devices for display using a wireless display protocol.

The processing system 704 can also include a secure processor 707 that includes one or more cryptographic engines and encrypted memory. The secure processor 707 can be used to perform cryptographic operations for the computing device 700.

The virtual assistant 720 is the logic that executes on the computing device 700 to provide the intelligent automated assistant system described herein. The virtual assistant 720 can be selectively given access to various software and hardware components within the computing device, including but not limited to the network interface 702 to retrieve data via a network, media playback applications to initiate or stop playback of media files, or user calendar data to schedule calendar events, tasks, reminders, or alarms. In one embodiment the virtual assistant 720 can interact with the call relay manager 721 to enable the computing device to answer a relayed incoming call via a voice command or another type of command or gesture to the virtual assistant 720.

Where the computing device 700 is within a smart speaker device capable of participating in a distributed playback system, a distributed playback module 712 can perform operations to manage various aspects of media playback, including but not limited to a playback queue manager 714 to manage a list of media to be played via a distributed playback system and a playback routing manager 716 to route media playback to specific elements of the distributed playback system. In one embodiment the playback routing manager 716 can connect with different elements of the distributed playback system via a connection established using the companion link module 722. The companion link module 722 can facilitate connection establishment and message relay over a companion link established between the speakers and devices of the distributed playback system to perform operations such as configuring channel output for a multi-channel playback system or coordinating volume adjustments across multiple connected speakers.

In one embodiment the companion link module 722 can interface with a call relay manager 721, which can be similar to the call relay manager 310 of FIG. 3A. A call relay manager on a cellular voice capable device can interface with the call relay manager 721 of the computing device to enable incoming calls on the cellular voice capable device to be relayed to and accepted on the computing device. For paired devices, the incoming call relay can be performed via a companion link connection. For unpaired devices, an ad-hoc connection can be established using the method 500 of FIG. 5.

In one embodiment, incoming call relay is implemented via a virtual baseband 723, which is a logic module that, via a companion link or secure ad-hoc connection can enable the computing device 700 to remotely operate a subset of the cellular functionality of a connected cellular voice capable device. Via the virtual baseband 723, programmatic access to baseband functionality can be accessed to allow higher-level software on the computing device 700 to operate as though the computing device includes cellular functionality. In such embodiment, a remote inter-process communication link can be established over the secure link, allowing programmatic control of call functionality in addition to streaming audio for the incoming telephone call.

In one embodiment, the event scheduler 730 can exchange data with the distributed playback module 712. The data exchange can be performed in response to input received via a user interface of the computing device 700 or a different computing device that participates within the distributed playback system. The data exchange can also be performed in response to activity requested via the virtual assistant 720. For example, and in one embodiment, an event scheduled via the event scheduler 730 can be associated with a media playlist, such that upon occurrence of the scheduled event, a playlist can be played via the playback queue manager 714. For example, an alarm can be scheduled to wake a user at a specific time. The alarm can be associated with a playlist, such that one or more media elements will be played in association with or as a replacement for an alarm sound. In one embodiment, a playlist can be associated with any event scheduled via the event scheduler 730, including reminder or timer expiration events.

In one embodiment, the playback queue manager 714 can manage multiple simultaneous playback queues, where the playback queues include one or more past, present or future media elements to be played via the computing device 700. The playback queues can be loaded with individual media elements or playlists that specify multiple media elements. The playback queues can include locally stored media, media that will be retrieved for playback via a media server or media that will be streamed from a local or remote media streaming server. Multiple types of media elements may be played over the distributed playback system via the playback queue manager, including multimedia files such, as but not limited to music, music videos, and podcasts, including audio or video podcasts, or audio and/or video clips of current news, weather, or sports events.

In one embodiment, the playback routing manager 716 can be used to select a playback device within the distributed playback system to use to play a playback queue. Depending on the number of playback devices within the distributed playback system, multiple different queues can be active on multiple different playback devices or multiple different playback devices within the distributed playback system can be grouped. Grouped playback devices can share a common playback queue and simultaneously play the same media. When a smart playback device is provisioned, the playback device can be associated with one or more users and/or one or more user accounts. The smart playback device can also be assigned a location and/or device type. In one embodiment, residential distributed playback network can be configured in which multiple user devices and play media via one or more smart playback devices within a residence. When a smart playback device is added to the residential network, a room or location of each playback device can be specified. An ownership can also be specified for each smart playback device that indicates whether the smart playback device is associated with a single user or if the smart playback device is a smart home device that is associated with multiple users.

While a smartphone and a smart home device are described in the context of incoming call relay, in one embodiment incoming call relay can be configured between any cellular baseband capable device and any secondary electronic or computing device that includes a microphone, a speaker, and a network interface.

As described above, one aspect of the present technology is the gathering and use of data available from specific and legitimate sources for use with a virtual assistant, as described herein. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to allow a user to access calendar or reminder data via a virtual assistant. Allowing the virtual assistant to access contact data can enable the virtual assistant to send messages or initiate telephone calls. Further, other uses for personal information data that benefit the user are also contemplated by the present disclosure. For instance, health and fitness data may be used, in accordance with the user's preferences to provide insights into their general wellness or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of smart home devices having access to personal data, the present technology can be configured to allow users to select to "opt in" or "opt out" of participation in the collection of personal information data during registration for services or anytime thereafter. In another example, users can select not to enable access to certain elements of personal or private data from a smart home device. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, some smart-home device functionality can be enabled based on aggregated non-personal information data or a bare minimum amount of personal information, such as the content being handled only on the user's device or other non-personal information that may be available.

Exemplary Application Programming Interface Architecture

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 8:
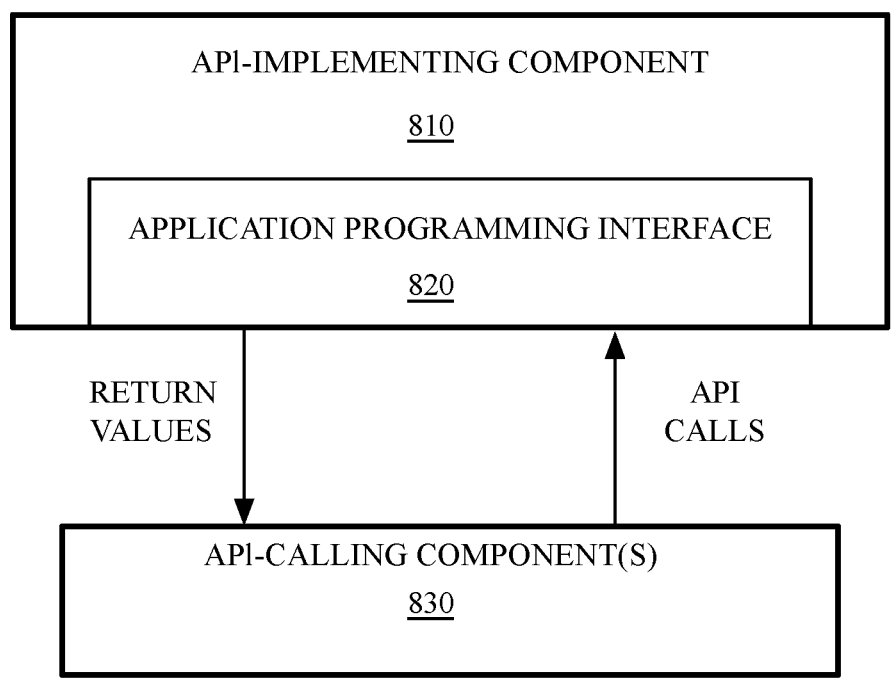
FIG. 8 is a block diagram illustrating an exemplary API architecture, which may be used in some embodiments of the invention.

FIG. 8 is a block diagram illustrating an API architecture 800, which may be used in some embodiments of the invention. The API architecture 800 includes the API-implementing component 810 (e.g., an operating system, a library, a device driver, an API, an application program, software or other module) that implements the API 820. The API 820 specifies one or more functions, methods, classes, objects, protocols, data structures, formats and/or other features of the API-implementing component that may be used by the API-calling component 830. The API 820 can specify at least one calling convention that specifies how a function in the API-implementing component receives parameters from the API-calling component and how the function returns a result to the API-calling component. The API-calling component 830 (e.g., an operating system, a library, a device driver, an API, an application program, software or other module), makes API calls through the API 820 to access and use the features of the API-implementing component 810 that are specified by the API 820. The API-implementing component 810 may return a value through the API 820 to the API-calling component 830 in response to an API call.

It will be appreciated that the API-implementing component 810 may include additional functions, methods, classes, data structures, and/or other features that are not specified through the API 820 and are not available to the API-calling component 830. It should be understood that the API-calling component 830 may be on the same system as the API-implementing component 810 or may be located remotely and accesses the API-implementing component 810 using the API 820 over a network. While FIG. 8 illustrates a single instance of API-calling component 830 interacting with the API 820, it should be understood that other API-calling components, which may be written in different languages (or the same language) than the API-calling component 830, may use the API 820.

The API-implementing component 810, the API 820, and the API-calling component 830 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 9A:
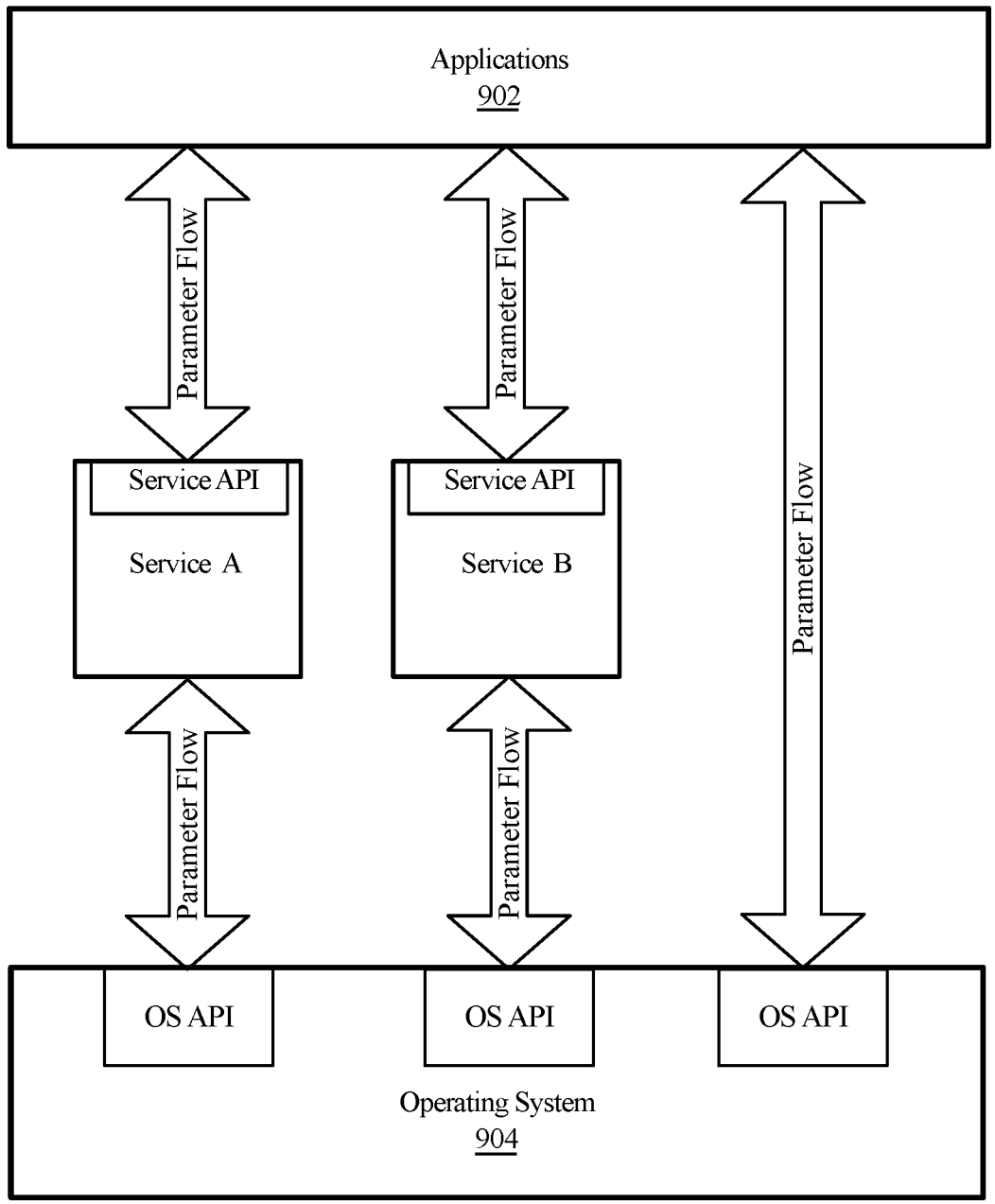
FIG. 9A-9B are block diagrams of exemplary API software stacks, according to embodiments.
Figure 9B:
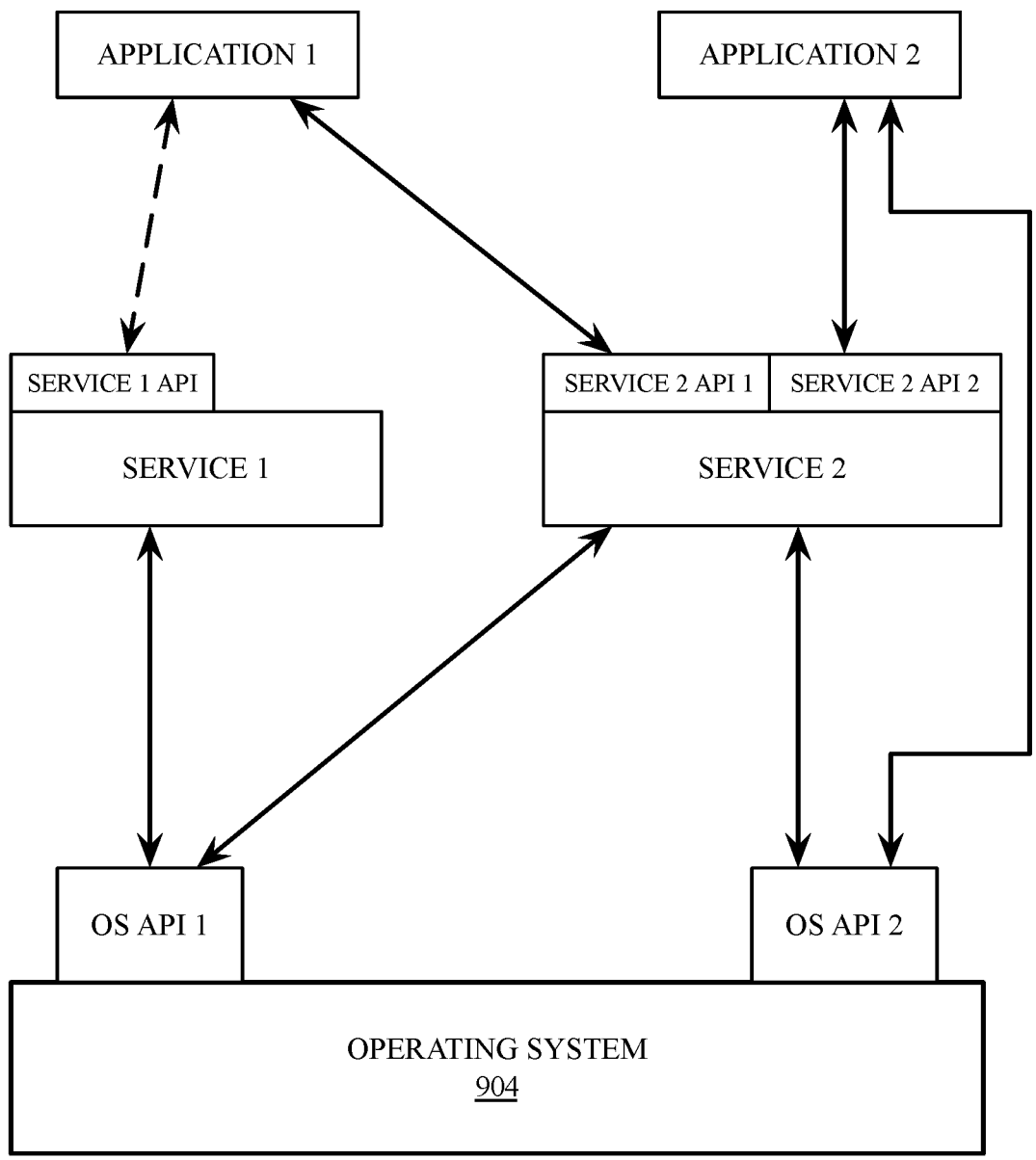

FIG. 9A-9B are block diagrams of exemplary API software stacks 900, 910, according to embodiments. FIG. 9A shows an exemplary API software stack 900 in which applications 902 can make calls to Service A or Service B using Service API and to Operating System 904 using an OS API. Additionally, Service A and Service B can make calls to Operating System 904 using several OS APIs.

FIG. 9B shows an exemplary API software stack 910 including Application 1, Application 2, Service 1, Service 2, and Operating System 904. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Additional Exemplary Electronic Devices

Figure 10:
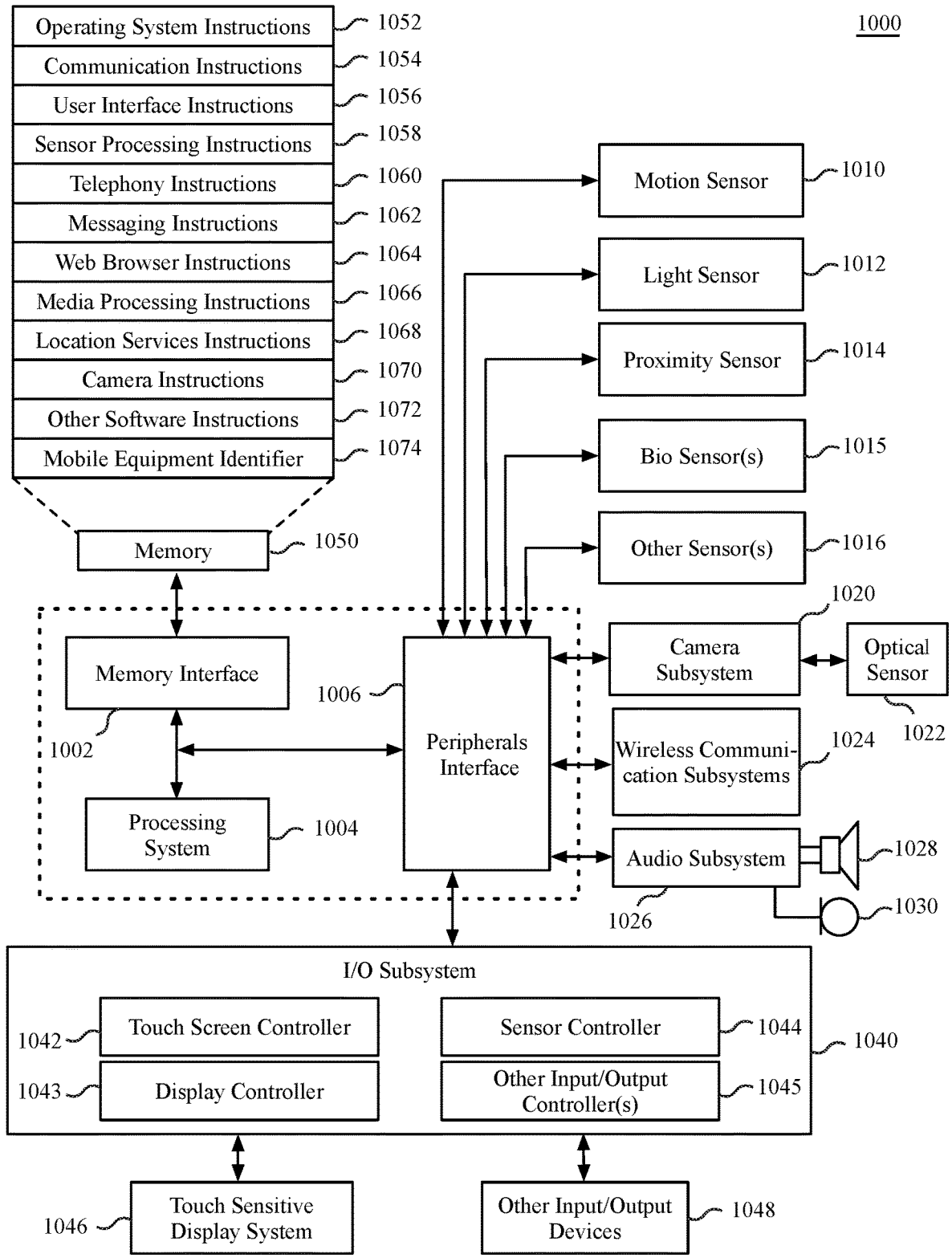
FIG. 10 is a block diagram of mobile device architecture, according to an embodiment.

FIG. 10 is a block diagram of a device architecture 1000 for a mobile or embedded device, according to an embodiment. The device architecture 1000 can be included in mobile devices described herein, such as smartphone devices, table computing devices, and/or wearable electronic devices. Aspects of the device architecture 1000 can also be included in a smart home device as described herein, alone or in combination with aspects of the computing device 700 of FIG. 7. The device architecture 1000 includes a memory interface 1002, a processing system 1004 including one or more data processors, image processors and/or graphics processing units, and a peripherals interface 1006. The various components can be coupled by one or more communication buses or signal lines. The various components can be separate logical components or devices or can be integrated in one or more integrated circuits, such as in a system on a chip integrated circuit.

The memory interface 1002 can be coupled to memory 1050, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate the mobile device functionality. One or more biometric sensor(s) 1015 may also be present, such as a fingerprint scanner for fingerprint recognition or an image sensor for facial recognition. Other sensors 1016 can also be connected to the peripherals interface 1006, such as a positioning system (e.g., GPS receiver), a temperature sensor, or other sensing device, to facilitate related functionalities. A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/ or optical (e.g., infrared) receivers and transmitters. The specific design and implementation of the wireless communication subsystems 1024 can depend on the communication network(s) over which a mobile device is intended to operate. For example, a mobile device including the illustrated device architecture 1000 can include wireless communication subsystems 1024 designed to operate over a GSM network, a CDMA network, an LTE network, a Wi-Fi network, a Bluetooth network, or any other wireless network. In particular, the wireless communication subsystems 1024 can provide a communications mechanism over which a media playback application can retrieve resources from a remote media server or scheduled events from a remote calendar or event server.

An audio subsystem 1026 can be coupled to a speaker 1028 and a microphone 1030 to facilitate voice-enabled functions, such as voice recognition, voice replication, digital recording, and telephony functions. Where the illustrated device architecture is included in smart home devices described herein, particularly smart home devices that are tailored for media playback, the audio subsystem 1026 can be a high-quality audio system including support for virtual surround sound and/or multi-channel audio. In some embodiments, multi-channel audio can be enabled using multiple smart home devices that are each configured to play a specific audio channel. The audio-channel configuration can be performed automatically by the smart home devices via communications performed over the companion link.

The I/O subsystem 1040 can include a touchscreen controller 1042 and/or other input controller(s) 1045. For computing devices including a display device, the touchscreen controller 1042 can be coupled to a touch sensitive display system 1046 (e.g., touchscreen). The touch sensitive display system 1046 and touchscreen controller 1042 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1046. Display output for the touch sensitive display system 1046 can be generated by a display controller 1043. In one embodiment, the display controller 1043 can provide frame data to the touch sensitive display system 1046 at a variable frame rate.

In one embodiment, a sensor controller 1044 is included to monitor, control, and/or processes data received from one or more of the motion sensor 1010, light sensor 1012, proximity sensor 1014, or other sensors 1016. The sensor controller 1044 can include logic to interpret sensor data to determine the occurrence of one of more motion events or activities by analysis of the sensor data from the sensors.

In one embodiment, the I/O subsystem 1040 includes other input controller(s) 1045 that can be coupled to other input/control devices 1048, such as one or more buttons, rocker switches, thumb-wheel, infrared port, USB port, and/or a pointer device such as a stylus, or control devices such as an up/down button for volume control of the speaker 1028 and/or the microphone 1030.

In one embodiment, the memory 1050 coupled to the memory interface 1002 can store instructions for an operating system 1052, including portable operating system interface (POSIX) compliant and non-compliant operating system or an embedded operating system. The operating system 1052 may include instructions for handling basic system services and for performing hardware dependent tasks. In some implementations, the operating system 1052 can be a kernel.

The memory 1050 can also store communication instructions 1054 to facilitate communicating with one or more additional devices, one or more computers and/or one or more servers, for example, to retrieve web resources from remote web servers. The memory 1050 can also include user interface instructions 1056, including graphical user interface instructions to facilitate graphic user interface processing.

Additionally, the memory 1050 can store sensor processing instructions 1058 to facilitate sensor-related processing and functions; telephony instructions 1060 to facilitate telephone-related processes and functions; messaging instructions 1062 to facilitate electronic-messaging related processes and functions; web browser instructions 1064 to facilitate web browsing-related processes and functions; media processing instructions 1066 to facilitate media processing-related processes and functions; location services instructions including GPS and/or navigation instructions 1068 and Wi-Fi based location instructions to facilitate location based functionality; camera instructions 1070 to facilitate camera-related processes and functions; and/or other software instructions 1072 to facilitate other processes and functions, e.g., security processes and functions, and processes and functions related to the systems. The memory 1050 may also store other software instructions such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. A mobile equipment identifier, such as an International Mobile Equipment Identity (IMEI) 1074 or a similar hardware identifier can also be stored in memory 1050.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions may be implemented in hardware and/or in software, including in one or more signal processing and/or application specific integrated circuits.

Figure 11:
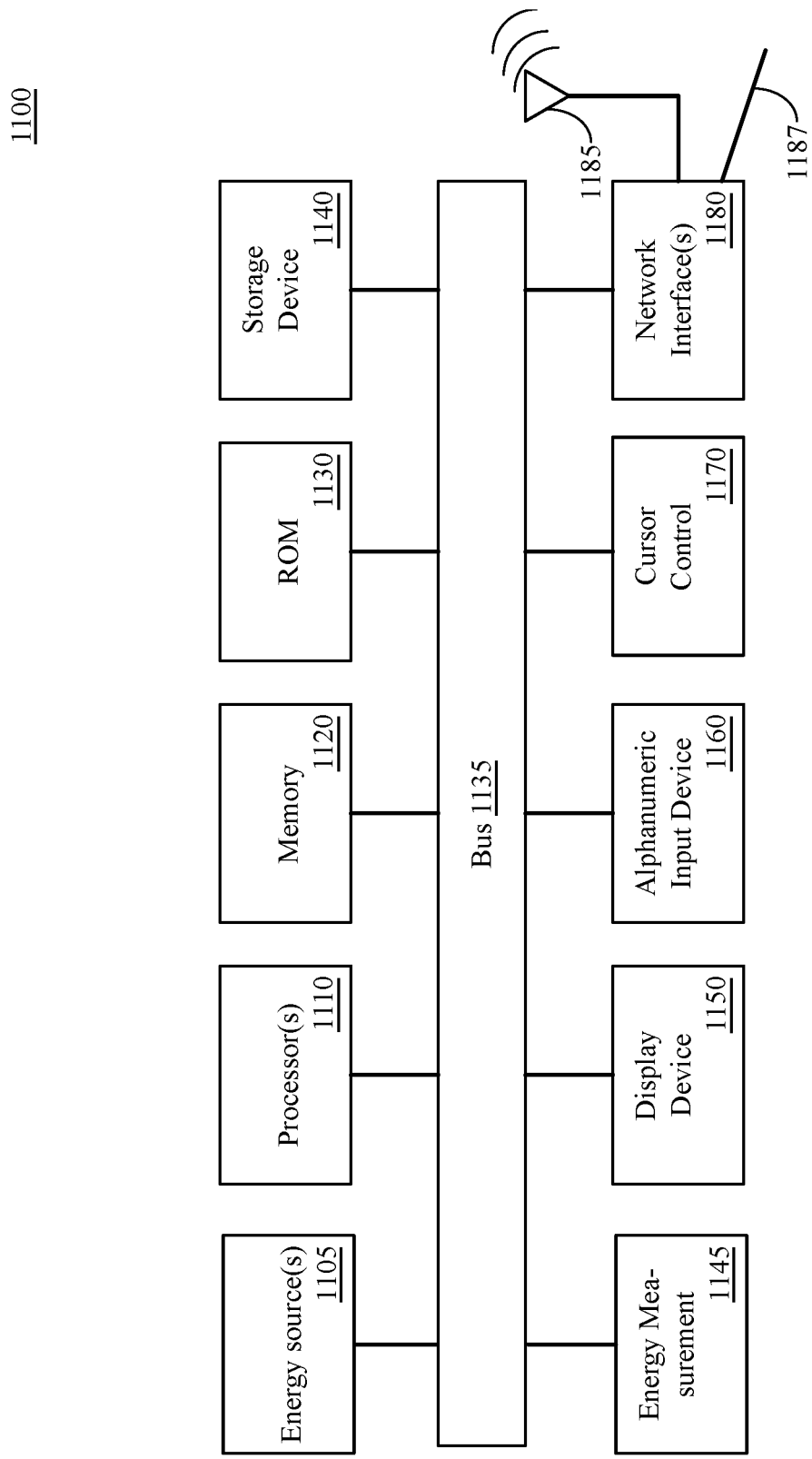
FIG. 11 is a block diagram of a computing system, according to an embodiment.

FIG. 11 is a block diagram of one embodiment of a computing system 1100. The computing system illustrated in FIG. 11 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system of FIG. 11 may be used to provide the computing device and/or a server device to which the computing device may connect.

The computing system 1100 includes bus 1135 or other communication device to communicate information, and processor(s) 1110 coupled to bus 1135 that may process information. While the computing system 1100 is illustrated with a single processor, the computing system 1100 may include multiple processors and/or co-processors. The computing system 1100 further may include memory 1120, such as random-access memory (RAM) or other dynamic storage device coupled to the bus 1135. The memory 1120 may store information and instructions that may be executed by processor(s) 1110. The memory 1120 may also be used to store temporary variables or other intermediate information during execution of instructions by the processor(s) 1110.

The computing system 1100 may also include read only memory (ROM) 1130 and/or another data storage device 1140 coupled to the bus 1135 that may store information and instructions for the processor(s) 1110. The data storage device 1140 can be or include a variety of storage devices, such as a flash memory device, a magnetic disk, or an optical disc and may be coupled to computing system 1100 via the bus 1135 or via a remote peripheral interface.

The computing system 1100 may also be coupled, via the bus 1135, to a display device 1150 to display information to a user. The computing system 1100 can also include an alphanumeric input device 1160, including alphanumeric and other keys, which may be coupled to bus 1135 to communicate information and command selections to processor(s) 1110. Another type of user input device includes a cursor control 1170 device, such as a touchpad, a mouse, a trackball, or cursor direction keys to communicate direction information and command selections to processor(s) 1110 and to control cursor movement on the display device 1150. The computing system 1100 may also receive user input from a remote device that is communicatively coupled via one or more network interface(s) 1180.

The computing system 1100 further may include one or more network interface(s) 1180 to provide access to a network, such as a local area network. The network interface(s) 1180 may include, for example, a wireless network interface having antenna 1185, which may represent one or more antenna(e). The computing system 1100 can include multiple wireless network interfaces such as a combination of Wi-Fi, Bluetooth®, near field communication (NFC), and/or cellular telephony interfaces. The network interface(s) 1180 may also include, for example, a wired network interface to communicate with remote devices via network cable 1187, which may be, for example, an Ethernet cable, a coaxial cable, a fiber optic cable, a serial cable, or a parallel cable.

In one embodiment, the network interface(s) 1180 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1180 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1100 can further include one or more energy sources 1105 and one or more energy measurement systems 1145. Energy sources 1105 can include an AC/DC adapter coupled to an external power source, one or more batteries, one or more charge storage devices, a USB charger, or other energy source. Energy measurement systems include at least one voltage or amperage measuring device that can measure energy consumed by the computing system 1100 during a predetermined period of time. Additionally, one or more energy measurement systems can be included that measure, e.g., energy consumed by a display device, cooling subsystem, Wi-Fi subsystem, or other frequently used or high-energy consumption subsystem.

Virtual Assistant System for Smart Home Devices

Figure 12:
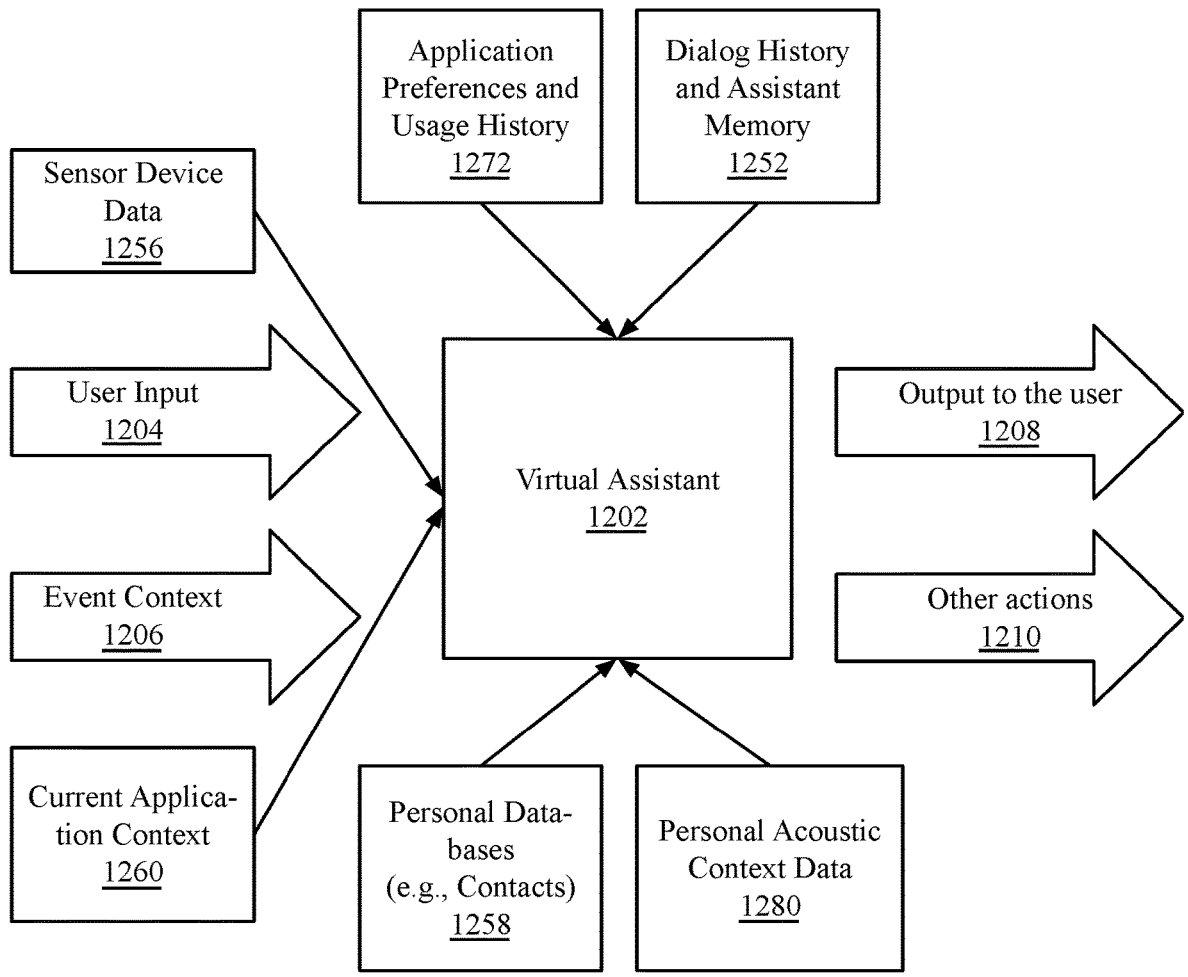
FIG. 12 is a block diagram of a virtual assistant, according to an embodiment.

FIG. 12 illustrates a block diagram of a virtual assistant system 1200, according to embodiments described herein. The illustrated virtual assistant system 1200 is exemplary of one embodiment and is not limiting as to all embodiments described herein. Virtual assistants employed by the various embodiment described herein may include additional, fewer and/or different components or features than those illustrated. The virtual assistant system 1200 includes a virtual assistant 1202 that can accept user input 1204, such as spoken or typed language, processes the input, and generate output 1208 to the user and/or perform 1210 actions on behalf of the user. The virtual assistant 1202 can use context information to supplement natural language or gestural input from a user. Context information can be used to clarify the intent of the user and to reduce the number of candidate interpretations of the user's input. The context information can also reduce the need for the user to provide excessive clarification input. Context can include any available information that is usable by the assistant to supplement explicit user input to constrain an information-processing problem and/or to personalize results. Context can be used to constrain solutions during various phases of processing, including, for example, speech recognition, natural language processing, task flow processing, and dialog generation.

The virtual assistant 1202 can draw on any of a number of different background sources of knowledge and data, such as dictionaries, domain models, and/or task models. From the perspective of the presently described embodiments, such background sources may be internal to the virtual assistant 1202 or can be gathered from one or more remote databases. In addition to user input 1204 and background sources, the virtual assistant 1202 can also draw on information from several sources of context, including, for example, device sensor data 1256, application preferences and usage history 1272, dialog history and assistant memory 1252, personal databases 1258, personal acoustic context data 1280, current application context 1260, and event context 1206.

In one embodiment, a physical device running the virtual assistant 1202, such as a user device, smart media playback device, or smart appliance as described herein, have one or more sensors devices. Such sensors can provide sources of contextual information in the form of device sensor data 1256. Examples of sensor information include, without limitation, the user's current location; the local time at the user's current location; the position, orientation, and motion of the device on which the user is interacting; the current light level, temperature and other environmental measures; the properties of the microphones and cameras in use; the current networks being used, and signatures of connected networks, including Ethernet, Wi-Fi and Bluetooth. Signatures include MAC addresses of network access points, IP addresses assigned, device identifiers such as Bluetooth names, frequency channels and other properties of wireless networks. Sensors can be of any type including for example: an accelerometer, compass, GPS unit, altitude detector, light sensor, thermometer, barometer, clock, network interface, battery test circuitry, and the like.

The current application context 1260 refers to the application state or similar software state that is relevant to the current activity of the user. For example, the user could be using a text messaging application to chat with a particular person. The Virtual assistant 1202 need not be specific to or part of the user interface of the text messaging application.

Instead, the virtual assistant 1202 can receive context from any number of applications, with each application contributing its context to inform the virtual assistant 1202. If the user is currently using an application when the virtual assistant 1202 is invoked, the state of that application can provide useful context information. For example, if virtual assistant 1202 is invoked from within an email application, context information may include sender information, recipient information, date and/or time sent, subject, data extracted from email content, mailbox or folder name, and the like.

In one embodiment, information describing the user's application preferences and usage history 1272 includes preferences and settings for various applications, as well usage history associated with those applications. Application preferences and usage history 1272 is used as context for interpreting and/or operationalizing the user's intent or other functions of the virtual assistant 1202. Examples of such application preferences and usage history 1272 include, without limitation, shortcuts, favorites, bookmarks, friends lists, or any other collections of user data about people, companies, addresses, phone numbers, places, web sites, email messages, or any other references; recent calls made on the device; recent text message conversations, including the parties to the conversations; recent requests for maps or directions; recent web searches and URLs; stocks listed in a stock application; recent songs or video or other media played; the names of alarms set on alerting applications; the names of applications or other digital objects on the device; and the user's preferred language or the language in use at the user's location.

Another source of context data is the personal database 1258 of a user on a device such as a phone, such as for example an address book containing names and phone numbers. In one embodiment, personal information of the user obtained from personal databases 1258 are used as context for interpreting and/or operationalizing the user's intent or other functions of the virtual assistant 1202. For example, data in a user's contact database can be used to reduce ambiguity in interpreting a user's command when the user referred to someone by first name only. Examples of context information that can be obtained from personal databases 1258 include, without limitation, the user's contact database (address book)—including information about names, phone numbers, physical addresses, network addresses, account identifiers, important dates—about people, companies, organizations, places, web sites, and other entities that the user might refer to; the user's own names, preferred pronunciations, addresses, phone numbers, and the like; the user's named relationships, such as mother, father, sister, boss, and the like; the user's calendar data, including calendar events, names of special days, or any other named entries that the user might refer to; the user's reminders or task list, including lists of things to do, remember, or get that the user might refer to; names of songs, genres, playlists, and other data associated with the user's music library that the user might refer to; people, places, categories, tags, labels, or other symbolic names on photos or videos or other media in the user's media library; titles, authors, genres, or other symbolic names in books or other literature in the user's personal library.

Another source of context data is the user's dialog history with the virtual assistant 1202. Such history may include, for example, references to domains, people, places, and so forth. For example, a user can ask "What's the time in New York?". The virtual assistant 1202 can respond by providing the current time in New York City. The user can then ask, "What's the weather?". The virtual assistant 1202 ca use the previous dialog history to infer that the location intended for the weather query is the last location mentioned in the dialog history.

Examples of context information from dialog history and virtual assistant memory include, without limitation, people mentioned in a dialog; places and locations mentioned in a dialog; current time frame in focus; current application domain in focus, such as email or calendar; current task in focus, such as reading an email or creating a calendar entry; current domain objects in focus, such as an email message that was just read or calendar entry that was just created; current state of a dialog or transactional flow, such as whether a question is being asked and what possible answers are expected; history of user requests; history of results of user requests, such as sets of restaurants returned; history of phrases used by the assistant in dialog; and facts that were told to the assistant by the user.

In one embodiment, personal acoustic context data 1280 be used to select from possible statistical language models that may be used to understand user speech, or otherwise tune the speech recognition to optimize for recognized acoustical contexts. When interpreting speech input, the virtual assistant 1202 can tune a speech to text service to consider the acoustic environments in which the speech is entered. For example, the noise profiles of a quiet office are different from those of automobiles or public places. If a speech recognition system can identify and store acoustic profile data, these data can also be provided as contextual information. When combined with other contextual information such as the properties of the microphones in use, the current location, and the current dialog state, acoustic context can aid in recognition and interpretation of input.

In the foregoing specification, the invention has been described regarding specific embodiments thereof. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described in accordance with an embodiment.

Embodiments described herein provide a communication mechanism that enables a communal electronic device, such as a smart speaker device or another smart home device, to establish a secure communication channel with other communal electronic device or a smartphone device. The communication mechanism can also be used as a general-purpose communication mechanism that enables smart home device to exchange data, including configuration data. Communication between the communal device and the companion device can be performed on a secure data channel referred to as a companion link. The companion link provides a persistent, low-latency messaging system for connected devices within a home network environment. In some embodiments, the companion link supports the linking of stationary communal devices within a home, such as speaker devices, with personal mobile devices in the home or reachable via the Internet. In one embodiment the companion link can be used to enable incoming call relay from a cellular voice capable device to a smart home device connected via a companion link connection.

One embodiment provides for a non-transitory machine-readable medium storing instructions to cause one or more processors of a mobile electronic device to perform operations comprising receiving a notice of an incoming call from a baseband processor of the mobile electronic device, sending a message to a multi-user smart home device indicating that a call is incoming at the smart home device, receiving an audio signal via a microphone of the mobile electronic device, the audio signal including an embedded code, and establishing an encrypted data channel with the multi-user smart home device, the encrypted data channel to relay audio of the incoming call to the multi-user smart home device, wherein the encrypted data channel is encrypted via an encryption key generated using the embedded code.

Embodiments described herein provide a multi-user smart home device comprising one or more speakers, a network interface, a memory device to store instructions, and one or more processors coupled with the memory device. The one or more processors execute instructions that cause the one or more processors to receive a first message via the network interface, the first message to indicate that a mobile electronic device proximate with the multi-user smart home device has an incoming call, the incoming call received via a baseband processor of the electronic device, determine a first audio sequence for playback via the one or more speakers, wherein the first audio sequence includes a call announcement for the incoming call, encode a seed identifier into the first audio sequence to generate a second audio sequence, the seed identifier to identify the multi-user smart home device to the mobile electronic device and to enable generation of an encryption key to encrypt a data channel between the multi-user smart home device and the mobile electronic device, play the second audio sequence via the one or more speakers, and receive a second message via the network interface, the second message to indicate that the mobile electronic device is to relay audio of the incoming call to the multi-user smart home device via an encrypted data channel, the encrypted data channel encrypted based on the encryption key. The multi-user smart home device can then play audio data for the incoming call via the one or more speakers, the audio data received via the encrypted data channel.

One embodiment provides for a mobile electronic device comprising a microphone, a network interface, a baseband processor, a memory device to store instructions, and one or more processors coupled with the memory device, the one or more processors to execute the instructions. The instructions cause the one or more processors to receive an indication of an incoming call, the incoming call received via the baseband processor, transmit a first message via the network interface to a multi-user smart home device proximate with the mobile electronic device, the first message to indicate that the mobile electronic device has an incoming call, receive an audio sequence via the microphone, the audio sequence having an encoded seed identifier, validate authenticity of the multi-user smart home device via the seed identifier, generate an encryption key using the seed identifier, transmit a second message via the network interface, the second message to indicate that the mobile electronic device is to relay audio of the incoming call to the multi-user smart home device via an encrypted data channel, the encrypted data channel encrypted based on the encryption key, and transmit audio data for the incoming call to the multi-user smart home device via the encrypted data channel.

In addition to the ad-hoc secure data channel, communication between a communal smart home device and a companion device can be performed on a secure data channel referred to as a companion link. The companion link provides a persistent, low-latency messaging system for connected devices within a home network environment. In some embodiments, the companion link supports the linking of stationary communal devices within a home, such as speaker devices, with personal mobile devices in the home or reachable via the Internet. Communal devices can advertise support for the companion link service over a discovery protocol. Personal user devices on the same network as the communal device can discover the companion link service advertised by the communal device and connect with the communal device using advertised information. The personal device can perform a pairing process with the communal device to become a companion device for a user. In one embodiment, call relay for paired devices can also be performed over the companion link connection.

Other features of the present embodiments will be apparent from the accompanying drawings and from the detailed description above. Accordingly, the true scope of the invention will become apparent to the skilled practitioner upon a study of the drawings, specification, and following claims.

What is claimed is:

1. A multi-user smart home device comprising:
one or more speakers;
a data interface;
a memory device to store instructions; and
one or more processors coupled with the memory device, the one or more processors to execute the instructions, wherein the instructions cause the one or more processors to:
receive a first message via the data interface, the first message to indicate that a mobile electronic device proximate with the multi-user smart home device has an incoming call, the incoming call received via a baseband processor of the mobile electronic device;
determine a first audio sequence for playback via the one or more speakers, wherein the first audio sequence includes a call announcement for the incoming call;
encode a seed identifier into the first audio sequence to generate a second audio sequence, the seed identifier to identify the multi-user smart home device to the mobile electronic device and to enable generation of an encryption key to encrypt a data channel between the multi-user smart home device and the mobile electronic device;
play the second audio sequence via the one or more speakers;
receive a second message via the data interface, the second message to indicate that the mobile electronic device is to relay audio data of for the incoming call to the multi-user smart home device via an encrypted data channel established via the data interface, the encrypted data channel encrypted based on the encryption key; and
play the audio data for the incoming call via the one or more speakers, the audio data for the incoming call received via the encrypted data channel.

2. The multi-user smart home device as in claim 1, wherein the data interface is a Wi-Fi network interface or a Bluetooth interface.

3. The multi-user smart home device as in claim 1, wherein the call announcement for the incoming call includes a ringtone, the ringtone associated with the mobile electronic device.

4. The multi-user smart home device as in claim 3, wherein the first message includes an identifier for the ringtone associated with the mobile electronic device.

5. The multi-user smart home device as in claim 1, wherein to encode the seed identifier into the first audio sequence to generate the second audio sequence, the one or more processors are to:
encode the seed identifier into a third audio sequence; and
mix the first audio sequence with the third audio sequence to generate the second audio sequence.

6. The multi-user smart home device as in claim 5, wherein to encode the seed identifier into the third audio sequence includes to modulate a carrier frequency by an input that represents the seed identifier.

7. The multi-user smart home device as in claim 6, wherein the carrier frequency is to be modulated amplitude modulation, frequency modulation, or phase modulation.

8. The multi-user smart home device as in claim 6, wherein the carrier frequency is dynamically selected.

9. The multi-user smart home device as in claim 1, wherein the seed identifier includes an identifier for the multi-user smart home device.

10. The multi-user smart home device as in claim 9, wherein the identifier for the multi-user smart home device includes a hardware identifier.

11. The multi-user smart home device as in claim 9, wherein the identifier for the multi-user smart home device includes a network identifier.

12. The multi-user smart home device as in claim 1, additionally including a microphone to receive audio to be transmitted as audio data over the encrypted data channel.

13. A mobile electronic device comprising:
a microphone;
a data interface;
a baseband processor;
a memory device to store instructions; and
one or more processors coupled with the memory device, the one or more processors to execute the instructions, wherein the instructions cause the one or more processors to:
receive an indication of an incoming call, the incoming call received via the baseband processor;
transmit a first message via the data interface to a multi-user smart home device proximate with the mobile electronic device, the first message to indicate that the mobile electronic device has the incoming call;
receive an audio sequence via the microphone, the audio sequence having an encoded seed identifier;
validate authenticity of the multi-user smart home device via the encoded seed identifier;
generate an encryption key using the encoded seed identifier;
transmit a second message via the data interface, the second message to indicate that the mobile electronic device is to relay audio data for the incoming call to the multi-user smart home device via an encrypted data channel, the encrypted data channel encrypted based on the encryption key; and
transmit the audio data for the incoming call to the multi-user smart home device via the encrypted data channel.

14. The mobile electronic device as in claim 13, wherein the data interface is a Wi-Fi network interface or a Bluetooth interface.

15. The mobile electronic device as in claim 13, wherein the first message includes an identifier for a ringtone associated with the mobile electronic device.

16. A non-transitory machine-readable medium storing instructions to cause one or more processors of a mobile electronic device to perform operations comprising:
receiving a notice of an incoming call from a baseband processor of the mobile electronic device;
sending a message to a multi-user smart home device indicating that a call is incoming at the multi-user smart home device;
receiving an audio signal via a microphone of the mobile electronic device, the audio signal including an audio sequence having an embedded code; and
establishing an encrypted data channel with the multi-user smart home device, the encrypted data channel to relay audio of data for the incoming call to the multi-user smart home device, wherein the encrypted data channel is encrypted via an encryption key generated using the embedded code.

17. The non-transitory machine-readable medium as in claim 16, wherein the encrypted data channel is established over a wireless network.

18. The non-transitory machine-readable medium as in claim 16, wherein the encrypted data channel is established via a direct wireless data connection with the multi-user smart home device.

* * * * *